United States Patent
Berman et al.

(10) Patent No.: US 7,428,120 B2
(45) Date of Patent: *Sep. 23, 2008

(54) SYSTEM AND METHOD FOR DECONVOLUTION OF MULTIPLE DATA TRACKS

(75) Inventors: David Berman, San Jose, CA (US); W. Stanley Czarnecki, Palo Alto, CA (US); Icko E. T. Iben, Santa Clara, CA (US); Wayne Isami Imaino, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/694,091

(22) Filed: Mar. 30, 2007

(65) Prior Publication Data

US 2007/0165326 A1    Jul. 19, 2007

Related U.S. Application Data

(63) Continuation of application No. 11/216,615, filed on Aug. 30, 2005.

(51) Int. Cl.
*G11B 5/58* (2006.01)
(52) U.S. Cl. .................................................. 360/77.01
(58) Field of Classification Search ........................ None
See application file for complete search history.

(56) References Cited

U.S. PATENT DOCUMENTS

| | | | | |
|---|---|---|---|---|
| 4,298,897 A | * | 11/1981 | Arter et al. .................... 360/39 |
| 4,729,048 A | * | 3/1988 | Imakoshi et al. .......... 360/234.7 |
| 4,903,150 A | | 2/1990 | Juso et al. ................. 360/77.12 |
| 5,289,328 A | | 2/1994 | Saliba ......................... 360/121 |
| 5,392,170 A | * | 2/1995 | Solhjell ........................ 360/63 |
| 5,432,652 A | | 7/1995 | Comeaux et al. .......... 360/77.12 |
| 5,448,430 A | | 9/1995 | Bailey et al. .............. 360/77.12 |
| 5,452,152 A | | 9/1995 | Rudi ........................ 360/77.12 |
| 5,574,602 A | | 11/1996 | Baca et al. ................ 360/77.12 |
| 5,629,813 A | | 5/1997 | Baca et al. ................ 360/77.12 |
| 5,898,534 A | | 4/1999 | Gray ........................ 360/77.01 |
| 6,104,556 A | | 8/2000 | Schaenzer ..................... 360/25 |

(Continued)

OTHER PUBLICATIONS

Kurtas et al., Reduced Complexity Maximum Likelihood Sequence Estimation for Multitrack High-Density magnetic Recording Channels IEEE Transactions on Magnetics, vol. 35, No. 4, Jul. 1999.

(Continued)

*Primary Examiner*—K. Wong
(74) *Attorney, Agent, or Firm*—Zilka-Kotab, PC

(57) ABSTRACT

A system and method for reading a magnetic medium having a data band thereon, the data band comprising a plurality of written data tracks and in some embodiments at least one alignment band. The system in one embodiment includes a plurality of adjacent readers for simultaneously reading the data tracks, at least some of the readers overlapping multiple data tracks. At least one reader is also present for reading the at least one alignment band. A mechanism determines a fractional overlap of each reader on the data tracks based on readback of the alignment band. A mechanism extracts data from readback of the data tracks based at least in part on the fractional overlap.

20 Claims, 13 Drawing Sheets

U.S. PATENT DOCUMENTS

| | | | | |
|---|---|---|---|---|
| 6,141,174 | A | 10/2000 | Judge et al. | 360/76 |
| 6,236,525 | B1 | 5/2001 | Cates et al. | 360/51 |
| 6,330,123 | B1 | 12/2001 | Schwarz et al. | 360/75 |
| 6,496,328 | B1 | 12/2002 | Dugas | 360/121 |
| 6,650,496 | B2 | 11/2003 | Nozieres et al. | 360/63 |
| 7,092,200 | B2 * | 8/2006 | Kitahara | 360/77.12 |
| 7,095,582 | B2 * | 8/2006 | Kitahara | 360/77.12 |
| 7,253,986 | B2 * | 8/2007 | Berman et al. | 360/77.01 |

OTHER PUBLICATIONS

Gyun Roh et al. "Ringle-Head/Single-Track Detection in Interfering Tracks" IEEE Transactions on Magnetics, vol. 38, No. 4, Jul. 2002.

Kato et al., "Two-Dimensional Run-Length-Limited Code and Partial Response Maximum Likelihood System with Mulut-Track Recording" WP.23, IEEE 2002.

Kumar et al., "Two-Dimensional Equalization: Theory and Applications to High Density Magnetic Recording" IEEE Transactions on Communications, vol. 42, No. 2/3/4, Feb./Mar./Apr. 1994.

Soljanin et al., "Multihead Detection for Multitrack Recording Channels" IEEE Transactions on Information Theory, vol. 44, No. 7, Nov. 1998.

Immink et al., "Signal Processing and Coding for Two-Dimensional Optical Storage" 2003.

Ahmed et al., "Track Squeeze Using Adaptive Intertrack Interference Equalization" IEEE Transactions on Magnetics, vol. 38, No. 5, Sep. 2002.

Voois et al., "Upper Bound on Achievable Storage Density: A Two-Dimentional Approach" IEEE Transactions on Magnetics, vol. 33, No. 1, Jan. 1997.

Voois et al., "Multichannel Signal Processing for Multiple-Head Digital Magnetic Recording" IEEE Transactions on Magnetics, vol. 30, No. 6, Nov. 1994.

Vea et al., "Magnetic Recording Channel Model with Intertrack Interference" DSSC, Depart. Elect. And Comp. Eng., Carnegie Mellon University, Pittsburgh, PA, 15213, IEEE 1994.

Singla et al, "Iteratice Decoding and Equalization for 2-d Recording Channels" IEEE Transactions on Magnetics, vol. 38, No. 5, Sep. 2002.

Barbosa, Lineu C., "Simultaneous Detection of Readback Signals form Interfering Magnetic Recording Tracks Using Array Heads" IEEE Transactions on Magnetics, vol. 26, No. 5, Sep. 1990.

Steele II et al., "Multi-Tapped Magentoresistive Heads for Magnetic Tape tracking Servo" IEEE Transactions on Magnetics, vol. 34, No. 4, Jul. 1998.

Barbosa et al., "Array Heads for Estimating track Misregistration" IEEE Transactions on Magnetics, vol. 29, No. 6, Nov. 1993.

Bain et al., "Limitations to Track Following Iposed by Position Error Signal SNR Using a Multi-Tapped Magnetoresistive Servo Head" IEEE Transactions on Magnetics, vol. 35, No. 2, Mar. 1999.

Davey et al., "Two-Dimensional Coding for a Multi-Track Recording System to Comabt Inter-Track Interference" IEEE Transactions on Magentics, vol. 34, Np. 4, Jul. 1998.

Voois et al, "Multichannel Digital Magnetic Recording" Information Systems Laboratory, Stanford University, Stanford, CA. 94305, IEEE 1992.

Voois et al, "A Decision Feedback Equalizer for Multiple-Head Digital Magnetic Recording" Information Systems Laboratory, Stanford University, Stanford, CA. 94305, IEEE 1991.

Vea et al, "Multichannel Equalization For High Track Densisty Magnetic Recording" IEEE, 1994.

Bellini et al., "Nonlinear Cross Talk Cancellation for High Density Optical Recording" Global Telecommunications Conference-Globecom, IEEE 1999.

Abbott et al., "Performance of Digital Magnetic Recording with Equalization and Offtrack Interference" IEEE Transactions on Magentics, vol. 27, No. 1, Jan. 1991.

Office Action Summary from U.S. Appl. No. 11/215,602 mailed on Aug. 7, 2006.

Office Action Summary from U.S. Appl. No. 11/216,615 mailed on Aug. 7, 2006.

U.S. Appl. No. 11/216,615, filed on Aug. 30, 2005.

Final Office Action Summary from U.S. Appl. No. 11/215,602 mailed on Jan. 16, 2007.

Notice of Allowance from U.S. Appl. No. 11/215,602 mailed on Apr. 4, 2007.

Office Action Summary from U.S. Appl. No. 11/216,615 mailed on Feb. 16, 2007.

* cited by examiner

SYSTEM AND METHOD FOR DECONVOLUTION OF MULTIPLE DATA TRACKS

RELATED APPLICATION

This application is a continuation of U.S. patent application Ser. No. 11/216,615, filed Aug. 30, 2005, and which is herein incorporated by reference.

FIELD OF THE INVENTION

The present invention relates to tape drive heads, and more particularly, this invention relates to a system where data is deconvoluted from readers overlapping multiple data tracks.

BACKGROUND OF THE INVENTION

Data is stored on magnetic media such as tape by writing data in a multiplicity of linear tracks. The tracks are separated along the transverse direction of the tape and a given track runs longitudinally along the tape.

In an effort to increase the amount of data that can be written for a given tape width, efforts have been made to make data tracks adjacent to one another. The most common method for writing is to use writers that are spaced apart by a predetermined distance. Furthermore, the predominant method of writing is to have a large separation between readers and a large separation between writers. Adjacent tracks are written in separate passes of the tape where the head is stepped over in the horizontal or transverse direction by the desired track width. The writer width is wider than the desired track width. With each pass, the newly written track overlaps the previously written track so the resulting width of the previous track is the desired final track width. The above described method is termed "shingling". Another method is to write adjacent tracks simultaneously. As the separation between tracks becomes narrower, horizontal motions of the writing/reading heads relative to the tape will reach values a fraction of the desired read/write track widths.

The technology used in existing tape storage drives aligns the readers within the width of a written track so each reader is aligned over a single track. The reader is typically smaller than the writer, is aligned therewith, and is reading one single track. This method is called "write wide, read narrow." Because the reader is narrower than the writer, the reader will tend no to read adjacent tracks in spite of the horizontal "wobble" of the tape relative to the reader as the tape moves across the head.

FIG. 1 illustrates a typical multitrack tape head 100 having a multitude of read elements 102 and write elements 104, where the read elements 102 are aligned with the write elements 104. Servo elements 106 (one shown) flank the read elements 102 and are used to sense servo tracks on the medium to keep the head 100 aligned over a data track during reading/writing. The figure shows a "piggy back" structure where a writer is stacked vertically over a paired reader. Many tape heads also have readers and writers which are aligned horizontally, either with groups of readers and groups of writers or alternating readers and writers.

A major drawback to the traditional "shingling" method, however, is that tape wobble increase the probability of overwriting adjacent data tracks during writing the reverse direction and also causes a random variation in the track width along the length of the tape. As the track width decreases, the amount of wobble (or track mis-registration) needs to decrease proportionally. As the track width is decreasing with future generations, it is becoming more difficult to decrease the track mis-registration sufficiently to keep readers on track and avoid overlap of readers on multiple written tracks.

One approach to control the written tracks is to use adjacent writers so a large group of adjacent tracks will be written simultaneously. Any horizontal motion (wobble) during write will cause the simultaneously-written tracks to move together, so the track-to-track separation (pitch) remains fixed within the group. Horizontal motion (wobble) results in large track misregistration during read, as a given reader can straddle two adjacent written tracks.

Furthermore, the servo tracks used for guiding the head-to-tape track alignment are typically written to the tape prior to writing any data. Thus, any wobble of a written track will not be contained in the servo tracks. So, during readback, even though the head is following the servo tracks, errors occur due to the wobble during both writing and readback. The errors can result in a particular reader reading two or more tracks simultaneously, especially where track spacing is minimal. The resultant signal is a composition of two fields from both tracks and may make extraction of the data from any single track impossible.

One approach to solve these problems would be to use a multiplicity of writers and readers, where the number of readers is greater than the number of writers and to allow for the readers to be misaligned with respect to the written tracks so that each reader will have components of more than one track. The data would then be deconvoluted using an algorithm that took the interference into account. A major difficulty in the deconvolution is that the group of written tracks will wobble (or wander) in the horizontal location along the length of the tape.

There is accordingly a clearly-felt need in the art for a head assembly and method for accurately and efficiently deconvoluting a read signal reflecting multiple written data tracks, thereby allowing accurate reading of data in spite of tape wobble. These unresolved problems and deficiencies are clearly felt in the art.

SUMMARY OF THE INVENTION

A system is provided for reading a magnetic medium having a data band thereon, the data band comprising a plurality of simultaneously written data tracks and at least one alignment band. The system in one embodiment include a plurality of adjacent readers for simultaneously reading the data tracks, at least some of the readers overlapping multiple data tracks. At least one reader is also present for reading the at least one alignment band. A mechanism determines a fractional overlap of each reader on the data tracks based on readback of the alignment band. Also, a mechanism extracts data from readback of the data tracks based at least in part on the fractional overlap.

Several methods for determining a fractional overlap of each reader on the data tracks based on readback of the alignment band and deconvolving the data from the data tracks are presented.

Any of these embodiments may be implemented in a tape drive system, which may include a magnetic head including the readers mentioned above, a drive mechanism for passing a magnetic recording tape over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nacre and advantages of the present invention, as well as the preferred mode of use, reference should be made to the following detailed description read in conjunction with the accompanying drawings.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein. Further, particular features described herein can be used in combination with other described features in each of the various possible combinations and permutations.

The following description discloses a method and system for successfully and accurately reading multiple data tracks where the readers overlap multiple tracks.

Figure 1:
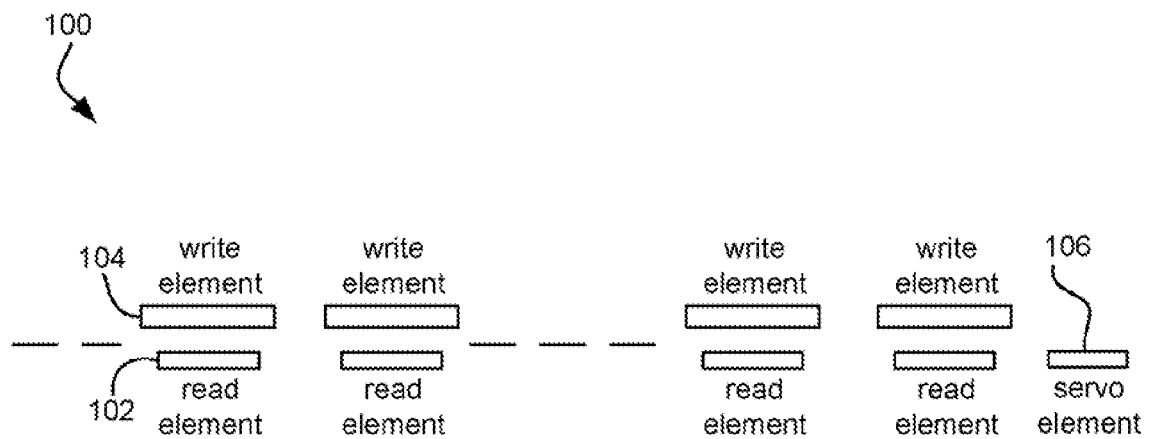
FIG. 1 is a representative view of a typical multitrack tape head having a multitude of read and write elements as seen from the tape bearing surface.
Figure 2:
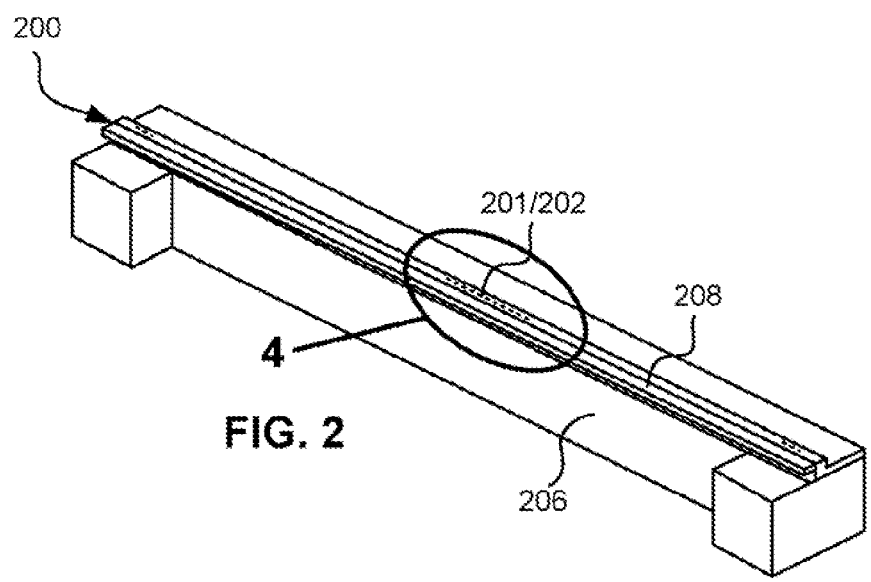
FIG. 2 illustrates a single module portion of a tape head.

FIG. 2 illustrates a module 200 carrying multiple readers 202 (also called sensors, read elements, etc.) and writers 201 (also called write elements, etc.). Note FIG. 4, which is a representative view of the readers and writers of the module of FIG. 2 taken from Circle 4 of FIG. 2. As shown, the writers 201 and readers 202 are positioned towards the middle of the module 200. More description of the readers and writers and preferred configurations will be presented below. One skilled in the art will appreciate that the configuration of write and/or readers 201, 202 can vary from those shown without straying from the spirit and scope of the present invention.

In order to increase the stability of the module 200 for the suitable use thereof, the module 200 is attached to a beam 206 of some sort formed of a rigid material. Such beams 206 are often referred to as a "U-beam." A closure 208 is often attached in view of the benefits it affords in resultant heads.

Figure 3:
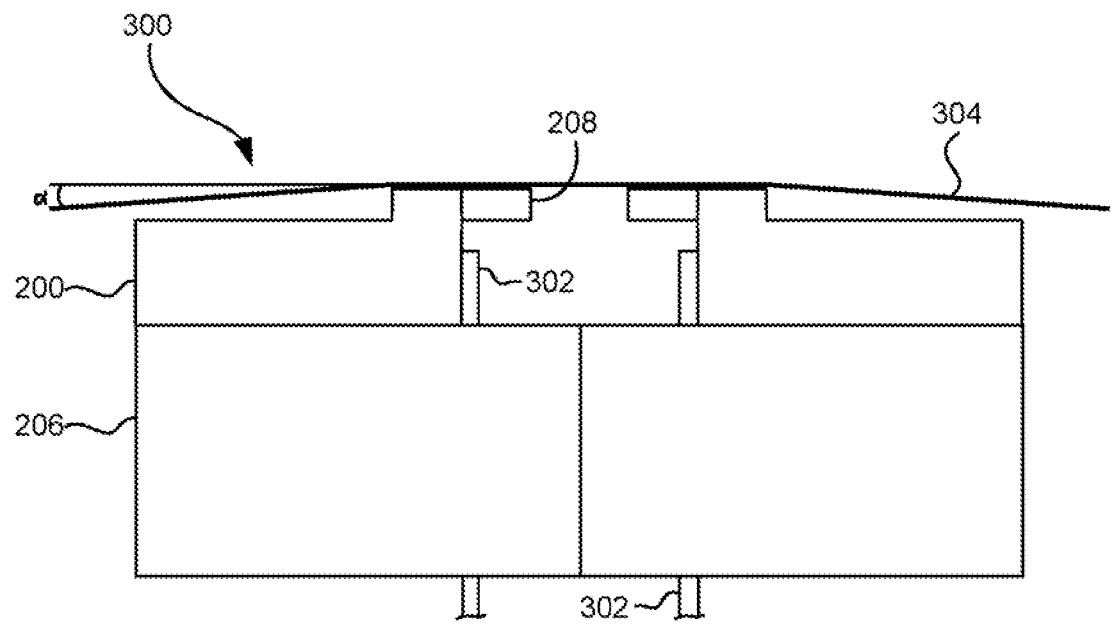
FIG. 3 illustrates a head for a read-while-write bidirectional linear tape drive in use, which includes two modules.

FIG. 3 illustrates a head 300 for a read-while-write bidirectional linear tape drive according to one embodiment of the present invention. "Read-while-write" means that the read element follows behind the write element. This arrangement allows the data just written by the write element to be immediately checked for accuracy and true recording by the following read element.

The head 300 of FIG. 3 is formed by coupling two flat profile modules 200, each module including multiple readers and/or writers. Specifically, in FIG. 3, two modules 200 are mounted on U-beams 206 which are, in turn, adhesively coupled. Cables 302 are fixedly coupled to the pads. The tape 304 wraps over the modules 200 at a predetermined wrap angle α. Note that the tape bearing surfaces of the modules 200 need not be coplanar, but rather can be angled relative to one another to create a desired wrap angle at each facing edge.

It should be noted that the two-module tape head 300 of FIG. 3 is representative only, as the precepts of the present invention can be implemented in any type of head where multiple tracks of information can be written and subsequently read.

One skilled in the art will appreciate that the configuration of write and/or readers 201, 202 can vary. For instance, one module can have all writers 201, while the other module can have all readers 202. Another example would be to have a plurality of writers 201 and readers 202 all aligned linearly perpendicular to the direction of tape movement. It should also be understood that the number of read and writers described herein are provided by way of example only, and can be increased or decreased per the desires of the designed, system requirements and capabilities, etc.

Another variation includes a head having only a single module of read and writers that provides all of the read/write functionality. A second module may or may not be present. Of course the shape of the module may be different than the module 200 shown in FIG. 2. One skilled in the art will appreciate how to create a single module design using traditional head designs.

Figure 4:
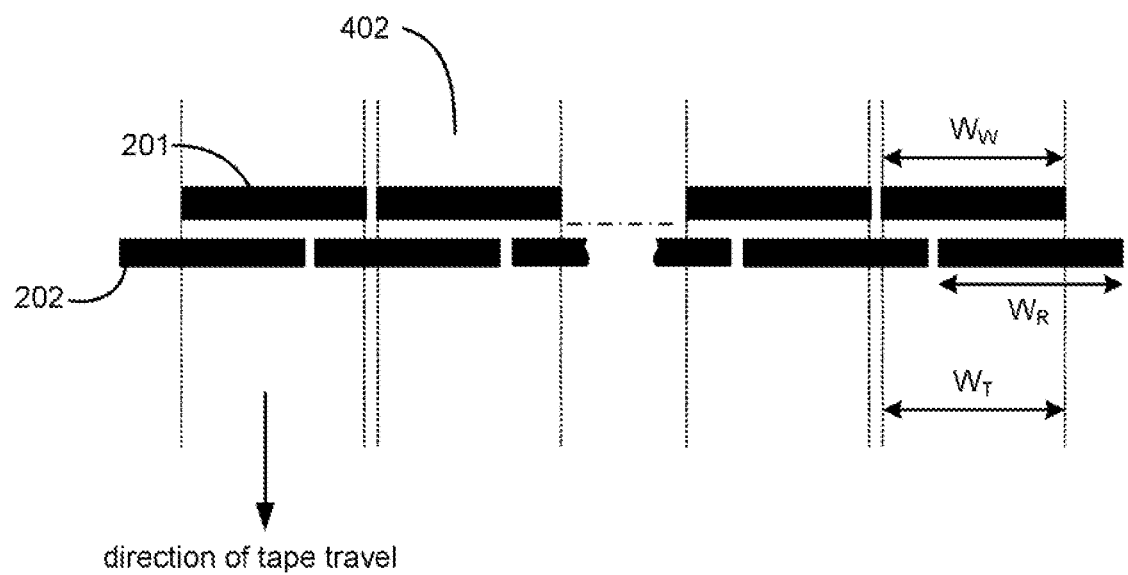
FIG. 4 is a representative view of the readers and writers of the module of FIG. 2 taken from Circle 4 of FIG. 2 and as seen from the tape bearing surface.

FIG. 4 is a representative view of the readers 202 and writers 201 of the module 200 according to one embodiment of the present invention. As shown, the width ($W_R$) of the readers 202 is about the same as the width ($W_W$) of the writers 201, and consequently, the width ($W_T$) of the written track 402 (shown in shadow to represent width of data track on the tape). However, the width ($W_R$) of the readers 202 may be greater or less than the width ($W_W$) of the writers 201 and/or track width ($W_T$) in some embodiments. The spacing between centerpoints of the readers 202 are preferably about equal to the spacing between centerpoints of the writers 201 as measured in a direction transverse to the direction of tape travel. Also, note that in many embodiments, including the now shown, more readers 202 are present than writers 201. The importance of these aspects will be discussed in more detail below, and are described here with reference to the drawings to provide context to the concepts.

As shown, the writers are adjacent to one another, and the readers are adjacent to one another. Adjacent refers to the horizontal alignment. Each reader is horizontally located adjacent to its neighbor with little or no horizontal separation. The adjacent alignment can also be accomplished by displacement of neighboring readers in the vertical direction (direction of tape motion) for physical considerations such as avoiding overlapping leads used to connect the readers to external devices, etc. During reading, some readers overlapping two data tracks will generate a convoluted signal reflecting influence from the two data tracks. The read signals representing multiple tracks per reader can then be deconvoluted to extract the original information written on each individual data track. For the following discussion, d represents a fractional overlap of a reader over one data track and f represents the fractional overlap of the reader over another data track. If, for example, reach track n (R(n)) has a fraction f of written track n (f*W(n)) and a fraction d of written track n+1 (d*W(n+1)), then the vector read signal for readers R is described by the matrix M times the vector written signal W: R=M*W. In the simple case where the readers are homogeneous, and all readers behave the same, f and d are described by Equations 1 and 2 respectively, below. The diagonal of M is given by f (M(i,i)=f), and the only nonzero components of the off-diagonal elements would be M(i,i−1)=d. In other words, where the reader is only over one track, f will equal 1. Where the reader is overlapping two tracks, the signal generated by the reader will be dependent upon f and d. Because in this embodiment of the present invention the reader can only overlap two tracks, the only nonzero components of the off-diagonal elements would be d. If the values of f and d are not known, then the algorithm will need to determine both f and d to deconvolve the signals R to obtain the written signals W. A major difficulty in the deconvolution process is that the group of written tracks will wobble (or wander) in the horizontal location along the length of the tape, making the values of f and d change along the track length. As described below, this difficulty has been overcome by the present invention.

To enable the system to determine the relative position of the readers 202 relative to the data tracks (e.g., the overlap of the readers relative to the tracks) an alignment band is used. The alignment band is written concurrently with the data tracks. The alignment band can include one or more written tracks of a known pattern (control track(s)) on the medium. The alignment band can also merely be on one or more erase or "blank" tracks. Suggested alignment signals are described below, and generally include a combination of "blank" tracks and control tracks.

Figure 5:
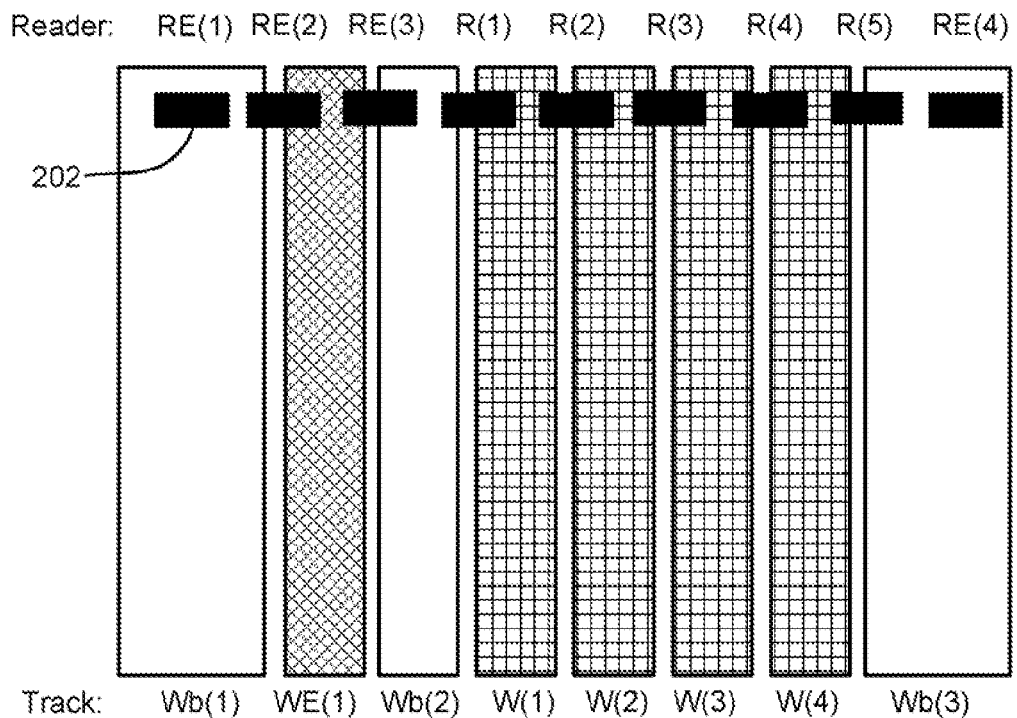
FIG. 5 is a simplified schematic of multiple written tracks, a single extra written control track, "blank" tracks and multiple readers.

FIG. 5 illustrates a data band including multiple written tracks W(1)-W(4), an extra written track (control track) WE(1), and erase or "blank" tracks Wb(1), Wb(2) sandwiching (surrounding or flanking) the control track WE(1). Note that the tracks W(1)-W(4), WE(1), Wb(1), and Wb(2) may be spaced from one another, may be immediately adjacent to one another, may overlap each other, or a combination of these modes. Also shown are multiple readers 202 and are identified as RE(1)-RE(4), R(1)-R(5). This example shows a case where blank tracks Wb(1) and Wb(3) are wider than a reader so it can be easily determined where the readers are located. Use of tracks wider than the reader is not necessary if the standard servo data is used. The outer blank written tracks Wb(1) and Wb(3) may also be one track width wide. The example is FIG. 5 represents the minimum suggested number of blank and extra tracks.

Figure 6:
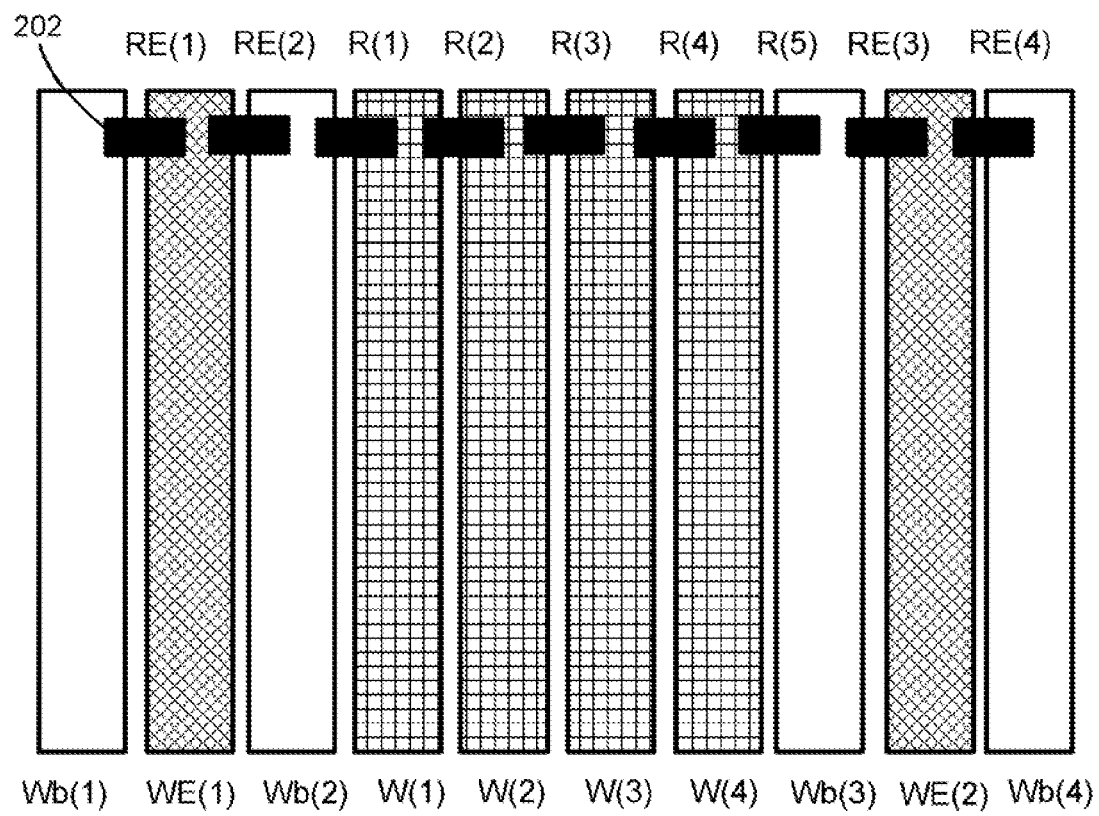
FIG. 6 is a simplified schematic of multiple written tracks on a medium, extra written control tracks on a medium, "blank" tracks on a medium, and multiple readers.

FIG. 6 illustrates multiple written tracks W(1)-W(4), extra written control tracks WE(1), WE(2), "blank" tracks Wb(1)-Wb(4) and multiple readers 202. It should be noted that the space between tracks is only to make it easier for the reader to see the separation, and need not be present. This figure shows four blank written tracks Wb(1)-Wb(4) and two control tracks WE(1), WE(2) sandwiched by them, for a total of two additional tracks when compared to the embodiment of FIG. 5. Adding additional control tracks improves the robustness of the scheme but also decreases the density of data tracks on the medium.

As shown in each case of FIG. 5 or FIG. 6 above, the control track(s) is/are separated or isolated from the other written tracks. The control track or tracks can be isolated, for example, by writing a DC OR AC erased track (blank) on either side of the isolated control track, as shown. It is also preferable to write at least one DC OR AC erased track (blank) on the far side of the written data tracks to isolate the group of written data tracks. And alternating current (AC) erased track could also be used. Then the readers which read the written control track(s) will only pick up a signal from the control track, making the determination of f and d unambiguous. The outer DC OR AC erased track (blank) enables a determination of the end of the data track and ensures that the outer reader reads only a single data track. The isolated control track, the DC OR AC erase track and the desired written tracks are preferably all written simultaneously so any wander in the bundle of tracks will be identical for all written tracks. The resulting tracks will be adjacent to one another and have about a constant (though not necessarily equal) center to center spacing along the length of the band of tracks.

Because the tracks are always uniformly spaced, the fractional signals read by the readers overlapping the isolated control track will be identical to the fraction of signals from readers overlapping any other written tracks, unambiguously allowing determination of the matrix inversion. The width of the outer DC OR AC erase tracks is preferably at least one track width wide, but might be chosen to be larger depending on the amount of track misregistration. Complications such as those due to differences in the response signal of a reader or non-homogeneous response along a reader/writer track width can be determined by a calibration procedure and the values stored in a look up table. The inversion matrix can then be appropriately adjusted.

Figure 7:
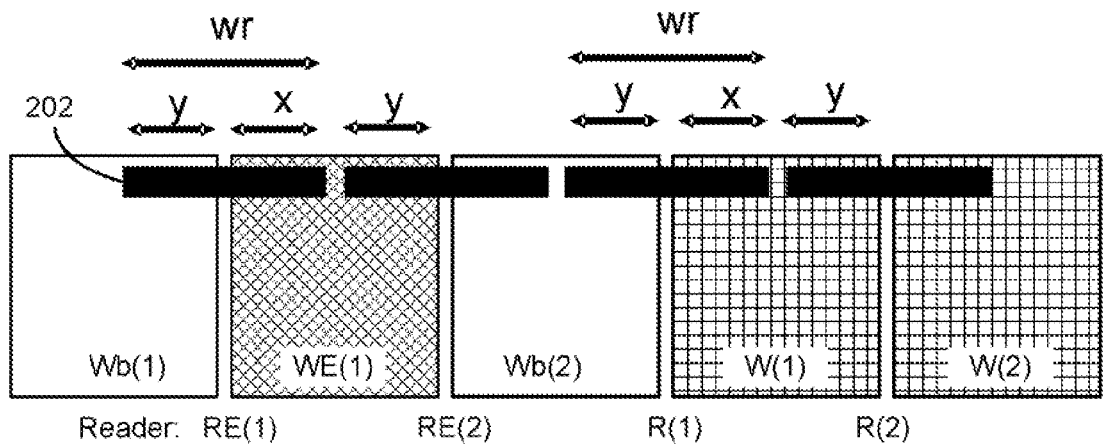
FIG. 7 is a schematic of readers each overlapping two tracks.

To illustrate the general method according to one embodiment of the present invention, assume N read tracks are on a head and P written tracks are present, with the width of the read and write tracks being nearly identical. Also assume N is greater than P, and that the writers are adjacent and the readers are adjacent. The signal for reader track n (R(n)) has a fraction of f of written track n (f*W(n)) and a fraction d of written track n+1 (d*W(n+1)). (Assuming the signals have the same intensity and the readers abut one another, then d=1−f). As mentioned above, d represents a fractional overlap of a reader over one data track and f represents the fractional overlap of the reader over another data track. FIG. 7 shows a schematic of a system where the fractional overlap d for a particular reader is equal to 1−f. In FIG. 7, a first reader R(1) overlaps a DC OR AC erased (blank) track Wb(2) and written track W(1) respectively by fractions f and d, while reader R(2) overlaps written tracks W(1) and W(2) with respective overlaps of d and f. The overlaps f and d can be calculated according to the following formulae, where x is the length of the overlap of the reader over one track, y is the length of overlap of the reader over another track, and $W_R$ is the total width of the reader, as shown in FIG. 7.

$$f = x/W_R \qquad \text{Equation 1}$$

$$d = y/W_R = 1-f \qquad \text{Equation 2}$$

The vector signal R for the readers is described by the matrix M times the vector signal W: R=M*W. The diagonal of M is given by f(M(i,i)=f), and the only nonzero components of the off-diagonal elements would be M(i,i−1)=d. If the values of f and d are not known, then the algorithm will need to determine both f and d to deconvolve the signals R to obtain the written signals W. A major difficulty in prior methods of deconvolution was that the group of written tracks will wobble (or wander) in the horizontal location along the length of the tape, making the values of f and d change along the track length. The writers used to write the tracks in this method of the present invention are aligned adjacent to one another and all tracks are written simultaneously so any wander in the bundle of tracks will be identical for all written tracks. The resulting tracks will be adjacent to one another and have about a constant (though not necessarily equal) center to center spacing along the length of the band of tracks.

For simplicity, and to match the illustrations in FIGS. 5-6, four written tracks W(1)-W(4) and five read tracks R(1)-R(5) are considered. Reader R(1) covers a fraction f of written track W(1), and reader R(2) covers a fraction f of track W(2) and d of track W(1). Taking R and W to be vectors where R is the read signal and W is the written signal, the matrix describing the signal is:

$$M = \begin{bmatrix} f, 0, 0, 0, 0 \\ d, f, 0, 0, 0 \\ 0, d, f, 0, 0 \\ 0, 0, d, f, 0 \\ 0, 0, 0, d, f \end{bmatrix}$$

The inverse of matrix M is:

$$IM = \begin{bmatrix} 1/f, & 0, & 0, & 0, & 0 \\ -1/f\wedge 2*d, & 1/f, & 0, & 0, & 0 \\ d\wedge 2/f\wedge 3, & -1/f\wedge 2*d, & 1/f, & 0, & 0 \\ -d\wedge 3/f\wedge 4, & d\wedge 2/f\wedge 3, & -1/f\wedge 2*d, & 1/f, & 0 \\ d\wedge 4/f\wedge 5, & -d\wedge 3/f\wedge 4, & d\wedge 2/f\wedge 3, & -1/f\wedge 2*d, & 1/f \end{bmatrix}$$

The written track vector is: W=(W(1), W(2), W(3), W(4), 0) while the read vector is: R=(R(1), R(2), R(3), R(4), R(5)).

The general solution to the inversion matrix for the number of written tracks being Ntrack requires a matrix dimension of Ndim=Ntrack+1, and assuming equal amplitude response for all readers and a uniform response along each reader track width.

---

```
M1(1:Ndim,1:Ndim)=0;
for jr=1:Ndim
    for jc=1:jr
        MI(jr,jc)=((−1)^(jc=jr))*((1/f)^(1+Ndim−jc))*(d^(Ndim−jc));
    end
end
```

---

The read signal given the written signal will be:

$$R = M*W \qquad \text{Equation 3}$$

The deconvolved written tracks (DW) are given by:

$$DW = IM*R = IM*M*W \qquad \text{Equation 4}$$

An equally valid matrix is:

$$M2 = \begin{bmatrix} d, & f, & 0, & 0, & 0 \\ 0, & d, & f, & 0, & 0 \\ 0, & 0, & d, & f, & 0 \\ 0, & 0, & 0, & d, & f, \\ 0, & 0, & 0, & 0, & d \end{bmatrix}$$

The inverse of matrix M2 is:

$$IM2 = \begin{bmatrix} 1/d, & -f/d\wedge 2, & f\wedge 2/d\wedge 3, & -f/3/d\wedge 4, & f\wedge 4/d\wedge 5 \\ 0, & 1/d, & -f/d\wedge 2, & f\wedge 2/d\wedge 3, & -f\wedge 3/d\wedge 4 \\ 0, & 0, & 1/d, & -f/d\wedge 2, & f\wedge 2/d\wedge 3 \\ 0, & 0, & 0, & 1/d, & -f/d\wedge 2 \\ 0, & 0, & 0, & 0 & 1/d \end{bmatrix}$$

The written track vector is: W2=(0, W(1), W(2), W(3), W(4)) while the read vector is: R2=(R(1), R(2), R(3), R(4), R(5)).

This second matrix (IM2) would be a better choice when d>f, especially when f<<1, due to errors in the signal to noise ratio (SNR) and the 1/f factors. The first matrix (IM) would be better than f>d. The two can also be combined to offer better SNR.

If an additional, isolated written track(s) WE(j) are made simultaneously (assuming at least one additional "extra" control track is written, surrounded by "blank" zones), the horizontal motion of the extra track(s) will be identical to that of the tracks with the "random" information written on the data tracks W. Since the extra track(s) is isolated (due to the "blank" zones, e.g., DC OR AC erased), the reader reading that signal will only get the signal from that track. With one extra control track (WE(1)), the values of f and d can be determined by Equations 5 and 6 (refer also to FIG. 7).

$$f = x/W_R = RE(1)/[RE(1)+RE(2)] \qquad \text{Equation 5}$$

$$d = y/W_R = 1-f = RE(2)/[RE(1)+RE(2)] \qquad \text{Equation 6}$$

When the width of the readers is less than the width of the writers so a spacing exists between readers, f and d are still given by the above two equations.

"Dead" regions (e.g., drop out zones) on the tape might occur where the extra written track is not written, so having an extra written track on either end of the group of data tracks might be desired and would give the user more flexibility in determining the relative off-track coupling.

For a tap to which no data has been written, the "blank" zone regions will inherently exist simply by not writing data over that region. Once a tape has been written to, transverse motion of the tape with respect to the head results in a variation in the location of the "blank" zone region for different passes over the same region of the tape. This may necessitate the creation of a "blank" zone whenever the tape is written to. This can be accomplished by having writers over the "blank" zone regions erase the tape in the "blank" zone simultaneously to data being written (Wb(1)-Wb(3)). This will ensure that the "blank" zones exist and follow the "wobble" of the written data tracks. An example of a tape erasure would be a "DC" erasure performed by writers over tracks Wb(1)-Wb(4) being powered with a constant current throughout the entire write process, sufficient to magnetizing the tape in the "blank zone regions in one orientation without any transitions. An "AC" erasure generally refers to applying a sufficiently high frequency current to the writers at a sufficiently high current level to write alternately oriented magnetic transitions on the tape at a physical spacing small enough that the read heads could not read them.

Servos and servo tracks may be used to maintain track following (and may be considered "control" tracks), but extra written control track(s) along with the "blank" zones will greatly assist in deconvoluting the signals due to overlap of the different written tracks onto each reader. The extra written tracks can also serve as a fine tune servo signal. The inversion matrix (IM) is uniquely determined with only the knowledge of f and d. Application of the inversion matrix is a simple summation and multiplication. While the extra written tracks and the "blank zone" separating the extra written tracks from the data tracks uses storage space, with a large number of simultaneously written tracks (16, 32, 64, . . . ) the fractional loss of area diminishes.

Several methods for determining the overlap of a reader or reader relative to a control track or tracks are presented below. Each of these methods assumes that the control tracks are written simultaneously to writing the data tracks so the track to track spacing in a particular data band will be constant in spite of any wobble. In other words, the wobble in the control track(s) and the wobble in the data tracks will be identical. In any of the following embodiments, one or more control tracks are written simultaneously with the data tracks.

Figure 8:
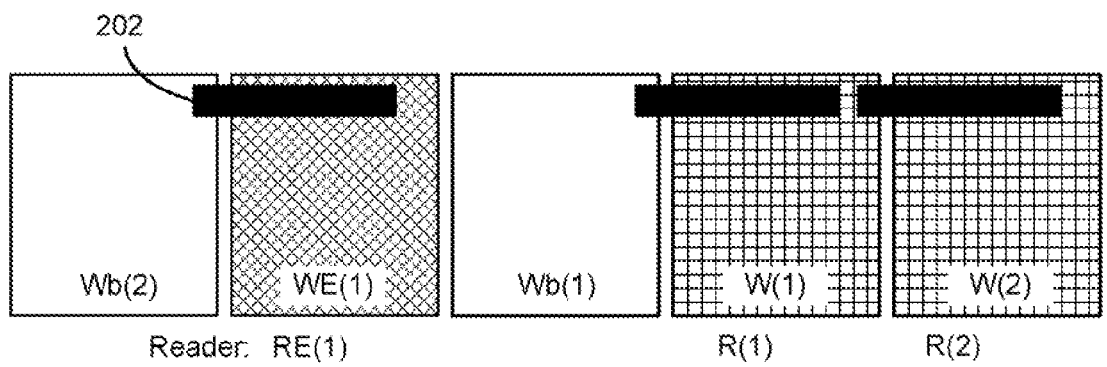
FIG. 8 is a schematic of one reader overlapping a single control track and a blank track.

In a single control track embodiment, as shown in FIG. 8, the control track WE(1) can be written adjacent to a DC or AC erased track WB(1) and optionally WB(2). The control track is then read back with a single reader RE(1). Preferably, the control track signal is a sinusoid. The reader signal amplitude is proportional to the amount of overlap of the reader on the control track. If the reader is completely over the control track, the readback signal will be at a maximum value. When the reader is 50% over the control track, the readback signal will be at 50% of the maximum value.

It should be kept in mind that noise will always be present. And because this method uses the amplitude of the readback signal to determine the relative overlap of the reader, changes in the amplitude may or may not indicate a true position. The amplitude can be affected by a variety of things, not just head position. For instance, even if the reader is on the track exactly, the amplitude will still vary from such things as head-tape spacing, grain magnetization, variation in magnetic grain density, tape defects, randomness of particles in the erase band, etc.

To provide even more reliability, one embodiment uses multiple head readings the same control track. For example, two readers can be used to read a single control track that is surrounded by two erase tracks, as in FIG. 7. Here, the difference in the amplitudes of the two readers can be used to generate the position information. A decrease in amplitude in one head should correlate to an increase in amplitude in the other head, and so the relative positions of the readers to the control track can be calculated based on the proportional signal from each head. Any loss in amplitude across both readers may indicate a variation due to head-tape spacing, grain magnetization, variation in magnetic grain density, tape defects, etc. rather than a change of position relative to the control track.

Figure 9:
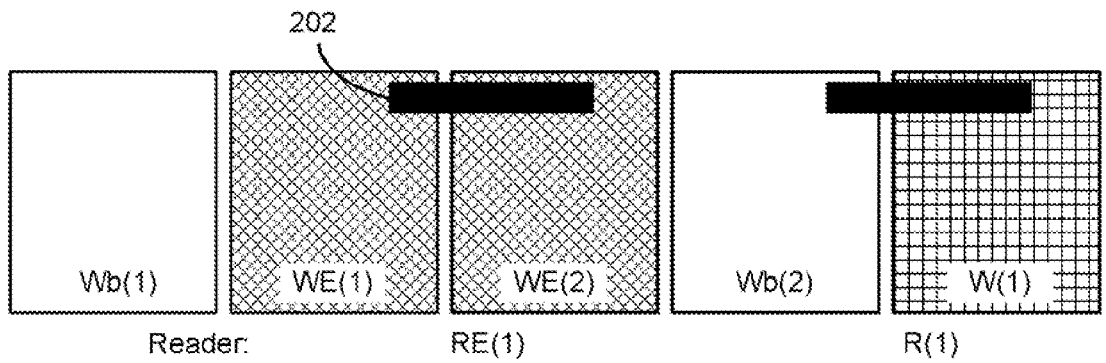
FIG. 9 is a schematic of one reader over two control tracks.

In another embodiment, shown in FIG. 9, two adjacent control tracks WE(1), WE(2) can be read back with a single reader RE(1). The two control tracks are written with different patterns. For example, two sinusoids can be used with slightly different frequencies (preferably not harmonics). The single reader generates signals from both control tracks. The resultant combined signal can be then be separated by filtering in a manner known in the art. The position information is obtained by measuring the relative amplitudes of the two components in the frequency domain and compared to a nominal value that compensates for the Wallace frequency dependence of the head. Based on the proportional strength of the amplitudes relative to each other, the position of the reader can be determined. This embodiment may eliminate any problems that would otherwise be caused by noise from an erase band.

In a further embodiment, two (or more) pseudo-random bit sequences (PRBS) can be chosen instead of two sinusoids to be written on dual control tacks (adjacent or separated, one or more readers per control track). The PRBS sequences should be orthogonal to each other and rotated versions of each other. The reader signal on these two tracks may be output to two matched filters, matched to the two PRBS sequences. The ratio of the outputs of the two matched filters can be used for positioning information. This is different than the previous method, because now simple sinusoids are not merely written, but rather repeating, random-appearing patterns are present in the control tracks.

It is important that the two PRBS sequences are unique enough to be identified. For instance, they may be orthogonal. This means that the dot product of the two sequences is zero or very small. If one of the sequences is rotated by an arbitrary number of bits, meaning that a number of bits from the end of the sequence are appended to the beginning, the dot product of the rotated sequences should be very small as well.

Consider the following example. Control track 1 has a pseudo-random bit sequence and control track 2 has a different pseudo-random bit sequence. The bit sequences can cover the entire frequency domain, and preferably are optimized for a high signal to noise ratio. So from the frequency domain, the signals may be nearly indistinguishable. Accordingly, the serving is performed in the time domain. The same sequences repeat over and over in each control track. A matched filter recognizes a match in the pseudo-random bit sequence, its output goes high thereby indicating a match. A second matched filter similarly analyzes the second control track.

In another embodiment, two control tracks are written on either side of the adjacent track bundle having an erase track on both sides, as in FIG. 6. The control tracks can be read back with two readers. The position information is generated from the amplitude difference between the two head outputs.

In yet another embodiment, control tracks also provide timing and phase information for clock recovery for the data read channels. As is well known in the art, the readback system of a storage system deciphers or decodes an incoming readback signal into 1s and 0s, thereby translating the signal into bits that were written to the tape (read channel). The clock recovery subsystem synchronizes the clock of the readback system to the clock of the write system so the drive knows when 1s and 0s are coming in on the readback signal. Clock recovery is one of the most difficult processes in tape drive readback systems. Particularly, any loss of signal or dropout can cause the drive to lose the clock. Accordingly, any way to improve clock recovery is desirable.

Error correction is typically built in. However, all of this is downstream from the initial data read. So if the timing is lost, the effects are not known immediately and large errors are typical. So it would be desirable to ensure that the clock is properly aligned to the timing signal, as well as detect timing errors more quickly.

To assist in timing verification, the control tracks can provide frequency and phase information for the clock recovery circuits in the data read channels. A sinusoid signal of known period is preferred as it is periodic in nature, and so the velocity of the tape and thus the timing can be easily calculated.

Figure 10:
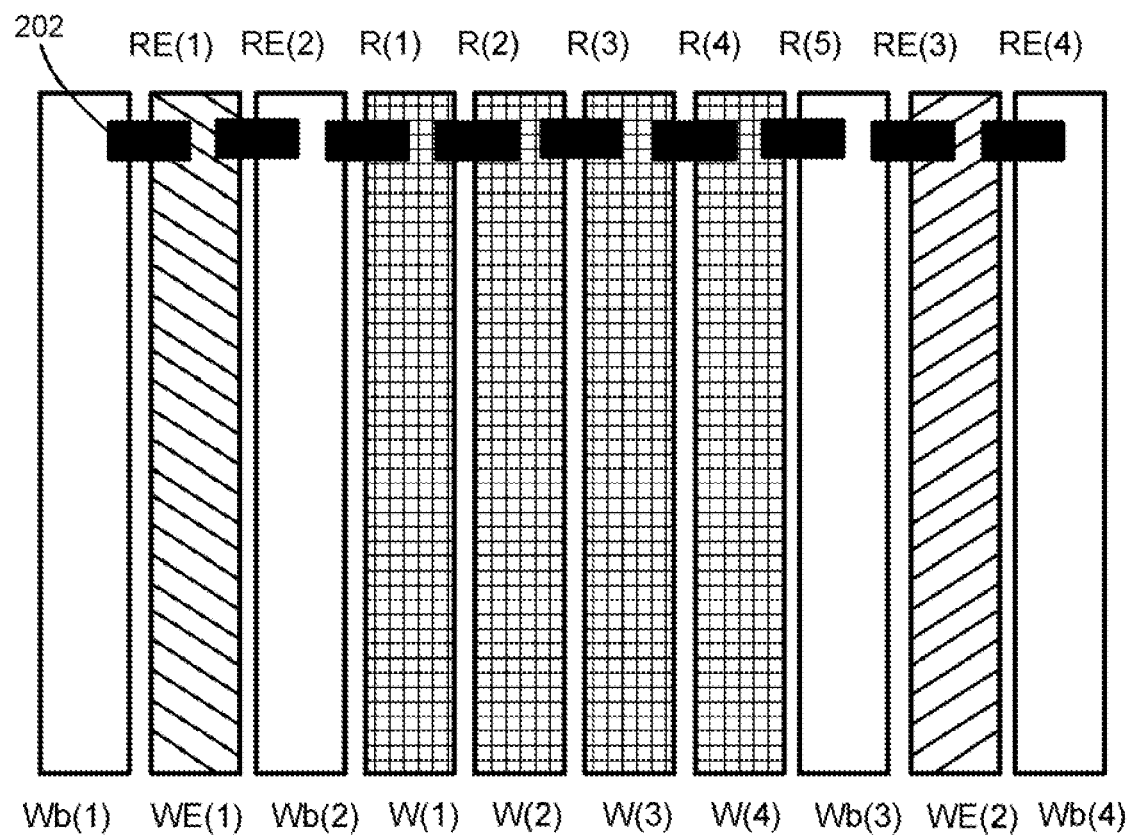
FIG. 10 is a representative view of an embodiment where the control tracks have angled magnetic transitions.

In a further embodiment, positioning information is obtained from the phase difference of two readers RE(1), RE(3) on two control tracks WE(1), WE(2) with angled magnetic transitions. Note that additional readers RE(2), RE(4) may be provided to add robustness. The angle between the transitions tilt so that the two tracks provides phase-based positioned information as shown in FIG. 10.

Each reader is preferably smaller than the width of the associated control track. As the medium passes by the readers, a pulse is generated at each written transition on the medium. When the two heads are in the middle, of the respective control tracks, the pulses arrive together. If the readers move laterally, on reader's pulse arrives sooner and the other reader's pulse arrives later. By measuring the spacing of the pulses, the positions of the readers relative to the control tracks can be determined.

To write the angled transitions, the writers are set at an angle.

Figure 11:
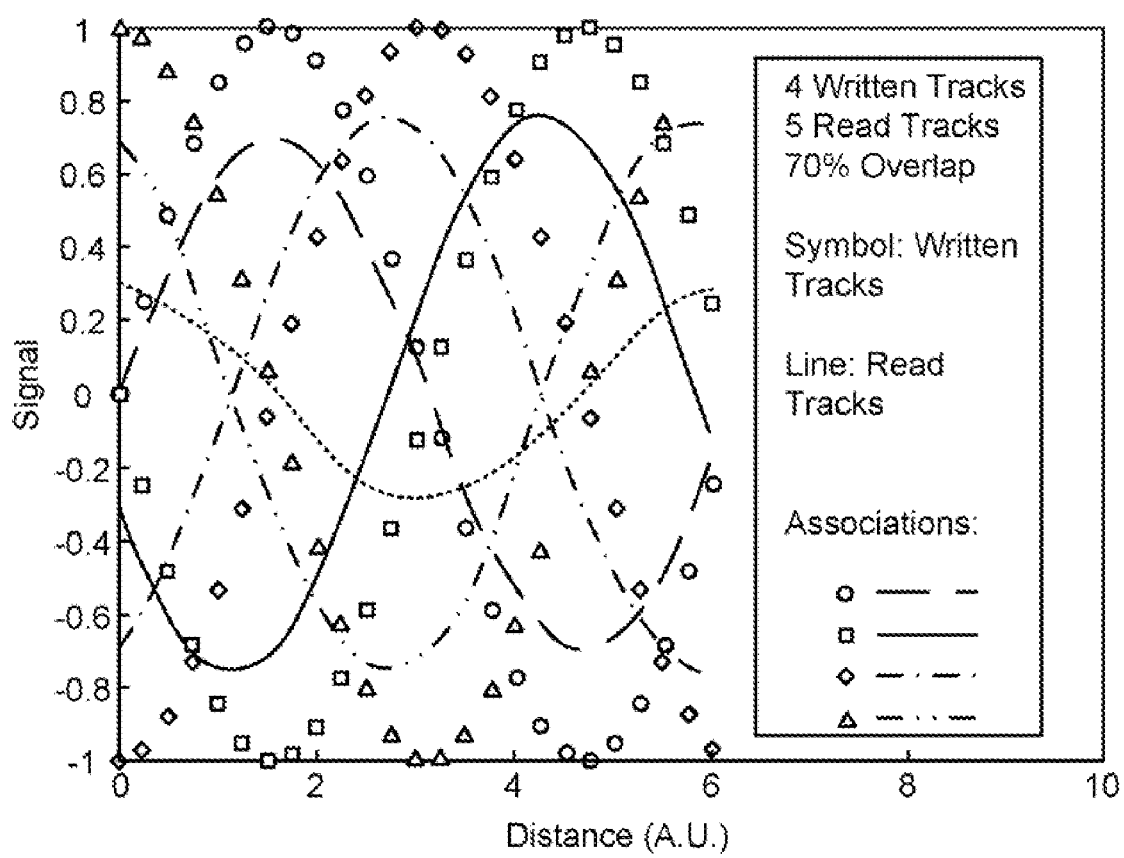
FIG. 11 is a plot of signal intensity for four parallel written tracks and five read signals overlapping the written tracks versus linear tape distance.
Figure 12:
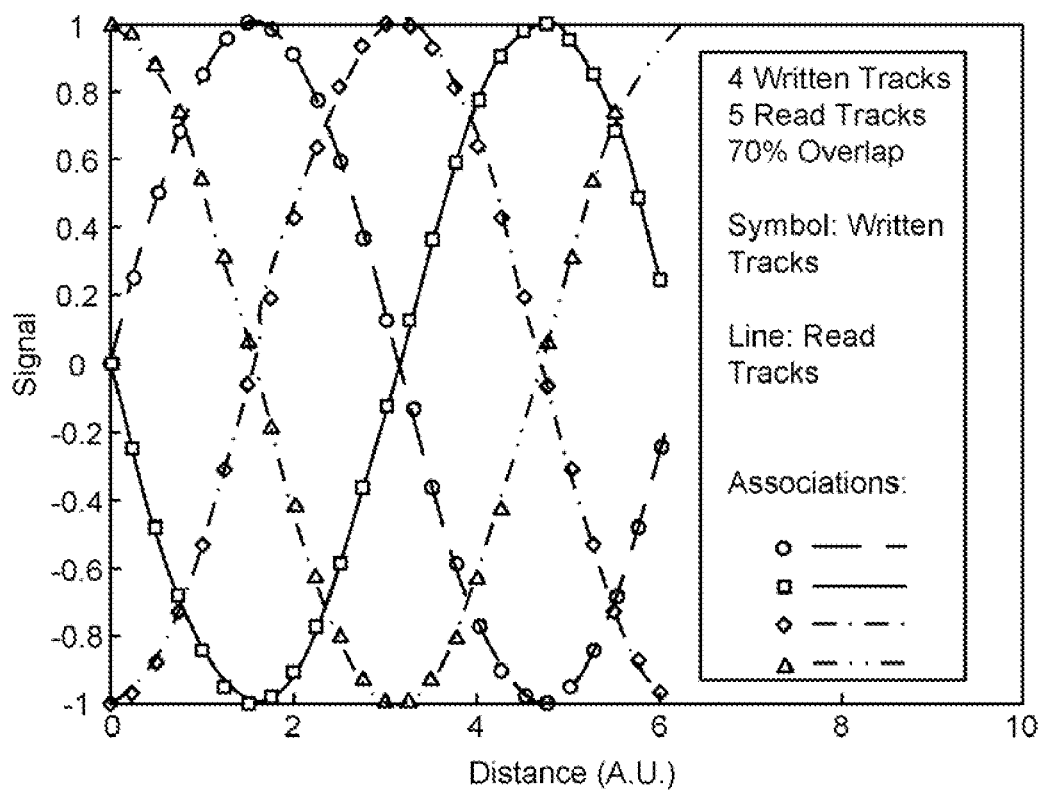
FIG. 12 is a plot of the four parallel written tracks of FIG. 11 and the corrected read signals.

FIGS. 11 and 12 show an example of the process using mathematically generated signals. Again, it is assumed that the overlap is determined by reading the signals from control tracks WE(1) and WE(2) using readers RE(1) and RE(2) and/or RE(3) and RE(4).

FIG. 11 is a plot of four parallel written tracks (symbol) and five read signals (line). FIG. 12 is a plot of four parallel written tracks (symbol) and the corrected read signals (line). In both FIGS. 11 and 12, the written tracks are all of the same amplitude, but out of phase by pi/2. The five read tracks are shifted horizontally with respect to the written tracks by 30% of the track width so the first read track has 70% of the first written track. The second read track has 30% of the first written track and 70% of the second written track, etc.

Figure 13:
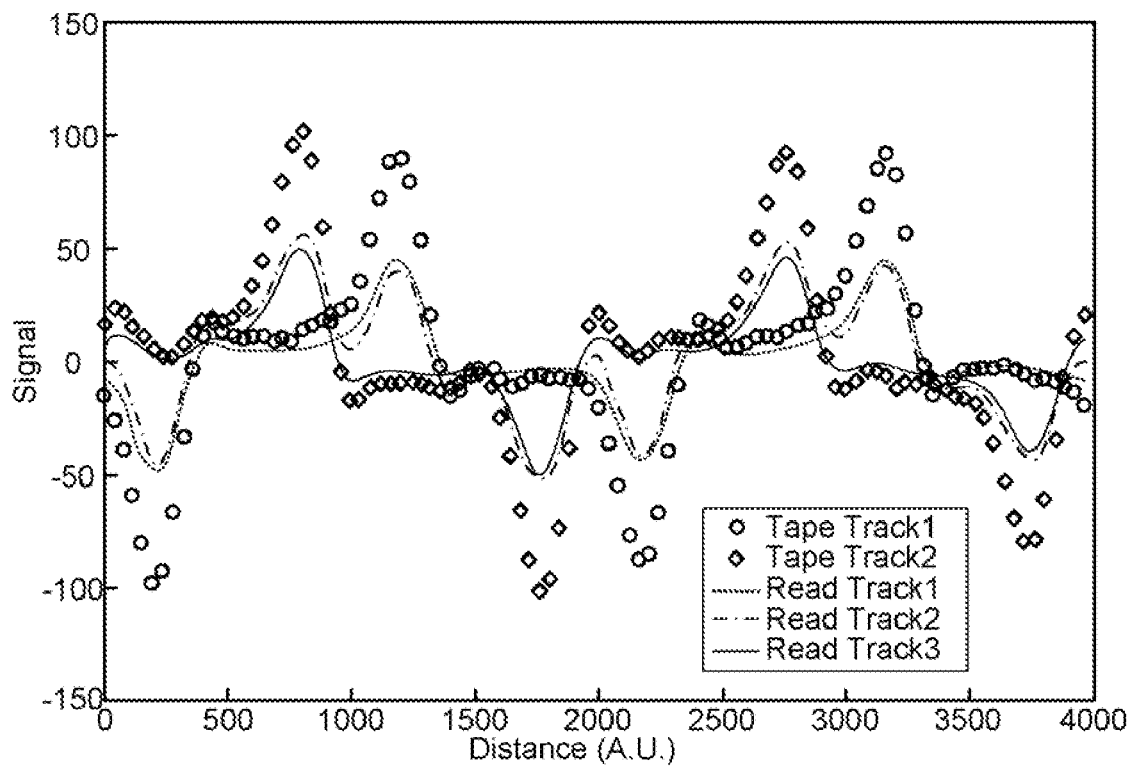
FIG. 13 is a plot of two parallel written tracks and three read signals overlapping the written tracks versus linear tape distance.
Figure 14:
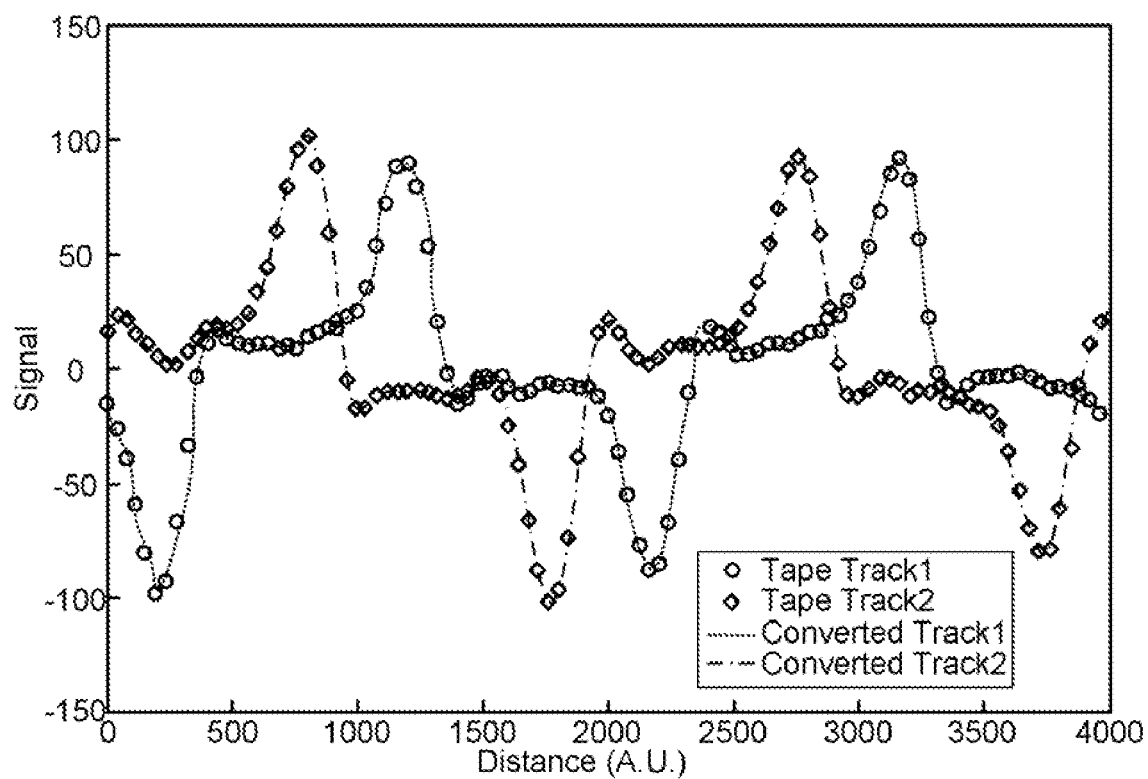
FIG. 14 is a plot of two parallel written tracks of FIG. 13 and the corrected read signals.

FIG. 13 shows an example of the process using two adjacent tracks written on to tape and read from the tape from an LTO drive (symbol). The second track is purposefully offset in time from the first to accentuate the effect of overlap. The three read tracks (indicated by lines) are shifted horizontally with respect to the written tracks by 50% of the track width so the first read track has 50% of the first written track. The second read track has 50% of the first written track and 50% of the second written track. The third read track has 50% of the second written track. FIG. 14 shows the deconvolution of the read overlapped signals of FIG. 13, illustrating recovery of the original tracks. The inversion matrix assumes that the 50% overlap is known.

The matrices described for the read signals (M) and the de-convolution of the read signals (MI) assumes that all of the readers have the same response. If the response of each reader is different, then a more complicated deconvolution algorithm may be implemented. Potential non-linearity or non-uniformity differences between readers include: (a) magnitude (amplitude); (b) asymmetry between positive and negative response; (c) differences in frequency response.

Regarding magnitude (amplitude) differences, magnitude or amplitude corrections are relatively easy to perform as long as they do not vary with time. Amplitude variations between the different readers due to the inherent differences in response are given by the matrix MA:

$$MA(i,i)=A(i) \qquad \text{Equation 7}$$

and $$MA(i,j)=0 \qquad \text{Equation 8}$$

when $j \neq i$.

The inversion matrix (IMA) is:

$$IMA(i,i)=1/A(i) \qquad \text{Equation 9}$$

and $$IMA(i,j)=0 \qquad \text{Equation 10}$$

when $j \neq i$.

Regarding asymmetry differences, matrices similar to MA and IMA describe asymmetric reader response, but two values of A(i) are used:

$$A(i)=Ap(i) \qquad \text{Equation 11}$$

if $R(i)>0$, and $$A(i)=An(i) \qquad \text{Equation 12}$$

if $R(i)<0$.

Figure 15:
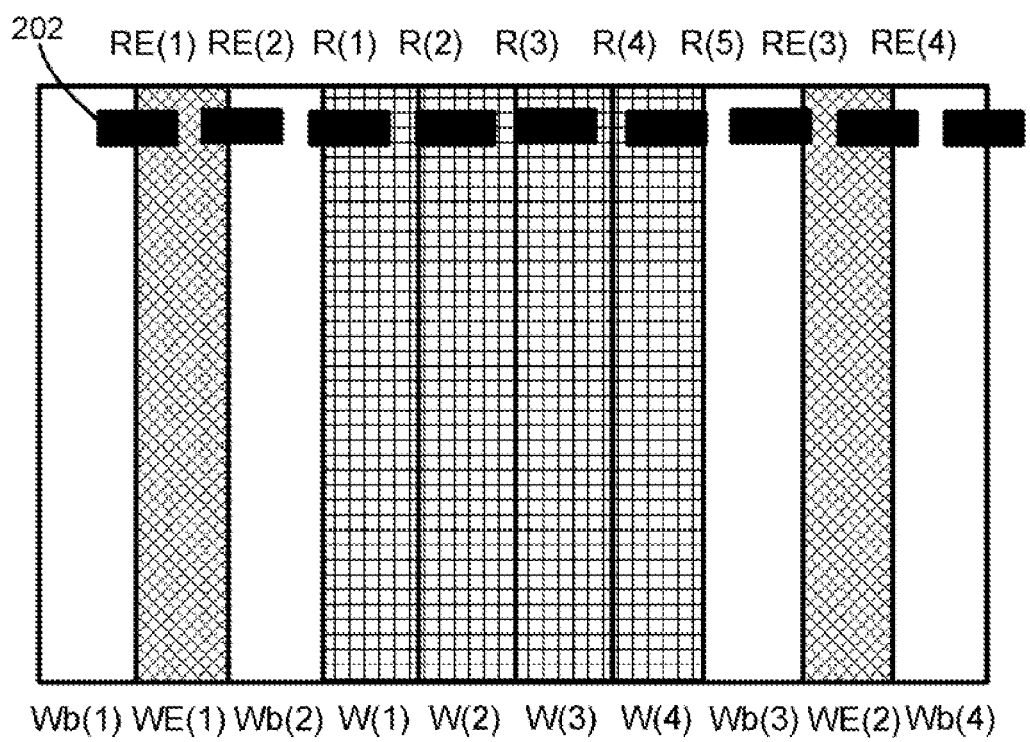
FIG. 15 is a simplified schematic of multiple written tracks, extra written tracks, multiple readers, and additional written tracks for calibration.

In order to utilize the more complicated correction algorithms, the response of the readers must be determined. One method of determining the response of the readers is to calibrate them in a designated section of the tape. In the calibration section of the tape, all writers write the same pattern. The amplitude and asymmetry response of each reader can then be determined. Even the frequency response can be determined. It is best if the frequency response of the readers is compensated for in the hardware such as the methods employed in existing tape drives using equalizer filters to boost high frequency signals, etc. To be sure that the edge readers are calibrated properly, more writers than those writing data should be employed. FIG. 15 shows a scheme to calibrate reader amplitude and asymmetries. In FIG. 15, enough written tracks are used so the written pattern extends beyond all of the readers. In a preferred embodiment, one writer is associated with one reader with an additional writer used to write tracks on either end of the array (i.e., the number of writers is two greater than the number of readers being calibrated).

Conversion of the read signals into data bits can be accomplished using standard algorithms such as peak detect or partial response, maximum likelihood (PRML), but would be applied to the corrected read signals (CR) rather than the directly read signals (R).

Figure 16:
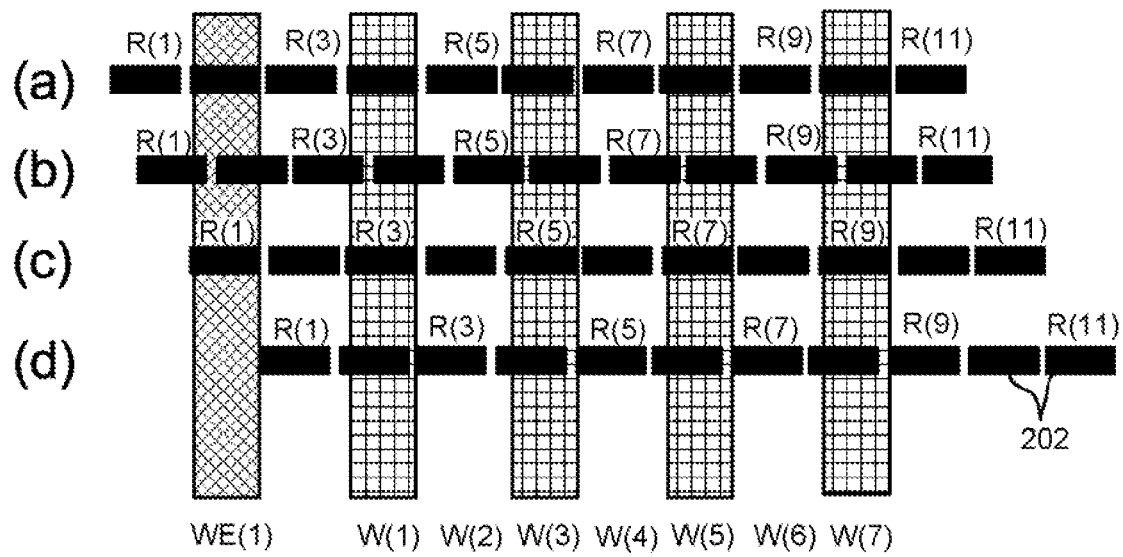
FIG. 16 is a schematic illustration of a microtrack profile calibration procedure.

A method of resolving a non-homogeneous reader profile along the reader track width is to perform an in-drive microtrack profile calibration. FIG. 16 is a schematic example of a certain embodiment, where data tracks, such as W(1), W(3), W(5), W(7), are written with a specific pattern using alternate writers along a segment of tape. The head is then passed over the calibration region, intentionally shifting the heads horizontally and measuring the signals as the tape is run longitudinally. In FIG. 16, the tape is moving vertically and the head is being moved from left to right as shown progressively in rows 16(*a*) to 16(*d*). The recorded signal for the odd readers R(1) will go from zero signal in 16(*a*) to a small number in 16(*b*) to maximum signal in 16(*c*) to zero in 16(d). The response of all readers along their track width will then be known, and can be factored into the matrix manipulation.

Figure 17:
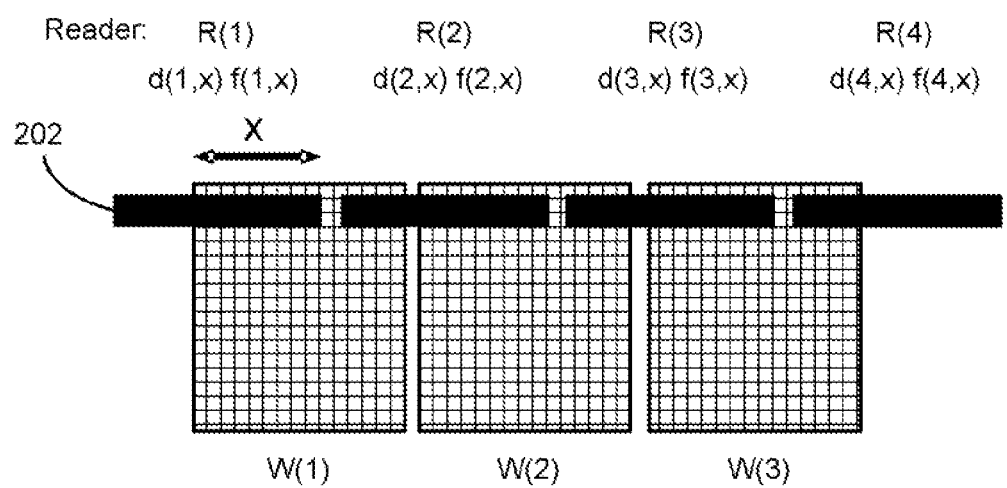
FIG. 17 is a schematic illustration of multiple readers which overlaps written tracks such that an inhomogeneous response is obtained across a reader width.

FIG. 17 depicts the situation for a non-homogeneous response across a reader width. Each reader has a different response. f(n,x) is the response of the nth reader from 0 to x and d(n,x) is the response of the nth reader from x to $W_R$. The values of (n,x) and d(n,x) are measured during the calibration procedure as shown in FIG. 13, where alternate tracks are written and the head is stepped horizontally while the tape is moving vertically. The values of f(n,x) and d(n,x) are then stored in a look-up table. The matrix (M) and inversion matrix (IM) for four written tracks with a five reader array is:

$$M = \begin{bmatrix} f1, & 0, & 0, & 0, & 0 \\ d2, & f2, & 0, & 0, & 0 \\ 0, & d3, & f3, & 0, & 0 \\ 0, & 0, & d4, & f4, & 0 \\ 0, & 0, & 0, & d5, & f5 \end{bmatrix}$$

$$IM = \begin{bmatrix} 1/f1, & 0, & 0, & 0, & 0, \\ -d2/Q/f1, & 1/f2, & 0, & 0, & 0, \\ d3*d2/f3/f2/f1, & -d3/f3/f2, & 1/f3, & 0, & 0, \\ -d4*d3*d2/f4/f3/f2/f1, & d4*d3/f4/f3/f2, & -d4/f4/f3, & 1/f4, & 0, \\ 0, & 0, & 0, & 0, & 1/d5 \end{bmatrix}.$$

Such that $$IM*M + I = \begin{bmatrix} 1, & 0, & 0, & 0, & 0 \\ 0, & 1, & 0, & 0, & 0 \\ 0, & 0, & 1, & 0, & 0 \\ 0, & 0, & 0, & 1, & 0 \\ 0, & 0, & 0, & 0, & 1 \end{bmatrix},$$

where I is the identity matrix or the diagonal matrix.

The value of fn(=f(n,x)) and dn(=d(n,x)) are a function of x. The function of x has been left out of the matrix for simplicity. The value of x is determined by the "extra" (control) written track(s) by the continuously measured vales of fE(=fE(x)) and dE (=dE(x)), where the values of fn and dn are predetermined. For actual use, the track can be divided into segments and the appropriate inversion matrices can be stored in a look-up table.

The value of f(j) and d(j) used in IM to deconvolute the signal is made by the measurement of fE and dE from the "extra" (control) tracks(s). For example, if all tracks have uniform response across their width, then fE=(x/WR), and dE=1−fE so all f(jr)=fE and all d(jr)=DE.

For a better determination of fE(x) and dE(x), rather than just relying on instantaneous values, an appropriate integral using an appropriate time can be used. The general form of the matrix is:

ndim=length(f);

for jr=1:ndim, for jc32 1:ndim, M(jr,jc)=0; end, end

M(1,1)=f(1); for jr=2:ndim, M(jr,jr)=f(jr);
    M(jr,jr−1)=d(jr); end

The general form of the inversion matrix is:

for jr=1:ndim, for jc=1:ndim, MI(jr,jc)=0; end, end

MI(1,1)=1/f(1);

for jr=2:ndim jc=jr; MI(jr,jc)=1/f(jr);

for nc=2:jr, jc=jc−1; IM(jr,jc)=−1*(d(jc+1)/f(jc)) *MI(jr,jc+1); end end

The read signal given the written signal will be:

R=M*W                                  Equation 13

The deconvoluted written (DW) tracks is given by:

DW=IM*R=IM*(M*W)=(IM*M)*W=I*W=W        Equation 14

Test of Superposition Using a Real Head

As a check that the response of the readers is linear so that the signals from readers which overlap two written tracks can be deconvolved using superposition, an experiment was tried with an LTO Generation 1 (Gen 1) head. This experiment provides a first indication of the feasibility of the deconvolution techniques described herein. The LTO Gen 1 heads have $S_R=S_W=333$ µm, $W_R=12.6$ µm and $W_W=26.5$ µm. The LTO Gen 1 heads have 8 readers and 8 writers on two modules. The readers of the "reading" module are aligned with the writers of the "writing" module. In the experiment, the tape was first AC erased. An 8T pattern was then written for a section of tape tracks W1(8T), W2(8T), . . . W8(8T) are all separated transversely by 333 µm.

Figure 18:
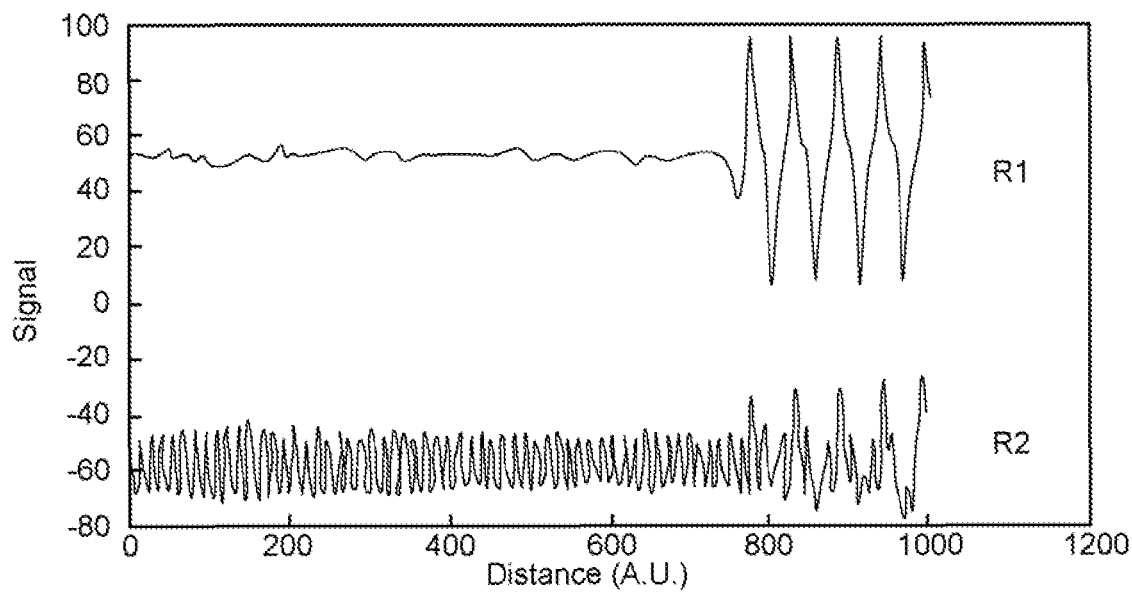
FIG. 18 is a chart illustrating signals generated by an LTO Gen 1 head.

FIG. 18 illustrates signals generated by an LTO Gen 1 head configured as described above. Reader R1 is aligned on written track W1 (8T), while reader R2 is positioned at ~50% on written track W2(8T) and −50% on track W1(2T). 2T and 8T refer to the patterns. An 8T pattern is written. The head was shifted by 333+20 µm so W1(8T) is an isolated 8T pattern and W1(2T) overlaps W2(8T). The overlap is ~6.8 µm (20 µ−$W_W$/2) from the center of the 8T pattern. The head was then located so R2 is centered on the overlap of W2(8T) and W1(2T). The overlap R1 with W1(8T) is ~98%. Prior to about data point 780, the signal from R1 is just noise while R2 is a 2T pattern due to the starting point of the 2T pattern being earlier than the 8T pattern starting point.

Figure 20A:
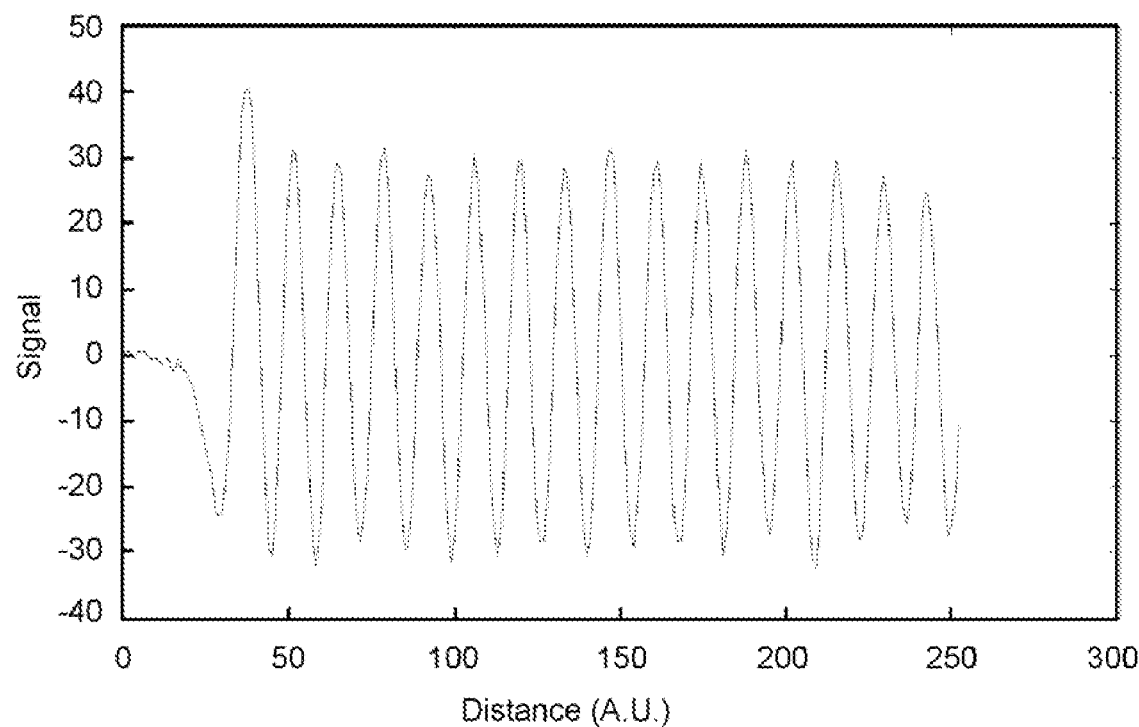
FIGS. 20A-B are charts showing signals generated by an LTO Gen 1 head.

The top curve of FIG. 18 shows the response of Reader R1 centered on track W1(8T). The flat line prior to channel ~780 is simply AC erased noise. The transitions seen from channel ~780 to 1000 are the 8T pattern. The head is then moved by 333+20 µm and a 2T pattern is then written. With this step, tracks W1(8T) and W8(2T) are isolated. Tracks Wn+1(8T) are adjacent to tracks Wn(wT)(n=1:7) with Wn+1(8T) being nominally 20 µm wide and Wn(2T) being the full 26.5 µm wide. FIG. 20A shows the response of the reader R2 centered on track W2(2T) as a clean 2T pattern. The head is then moved to position 6.8 µm so R1 is nominally 98% on W1(8T) and R2 is nominally 50% on W2(8T) and W1(2T). The lower trace in FIG. 18 shows the resulting signal for R2. Between channel 0 and ~780 a 2T pattern is read, which is the pattern from −50%*W1(2T). At channel ~780, the 8T pattern from W2(8T) is also picked up yielding a mixed signal of ~50%*W1(8T) plus ~50%*W1(2T).

Figure 19:
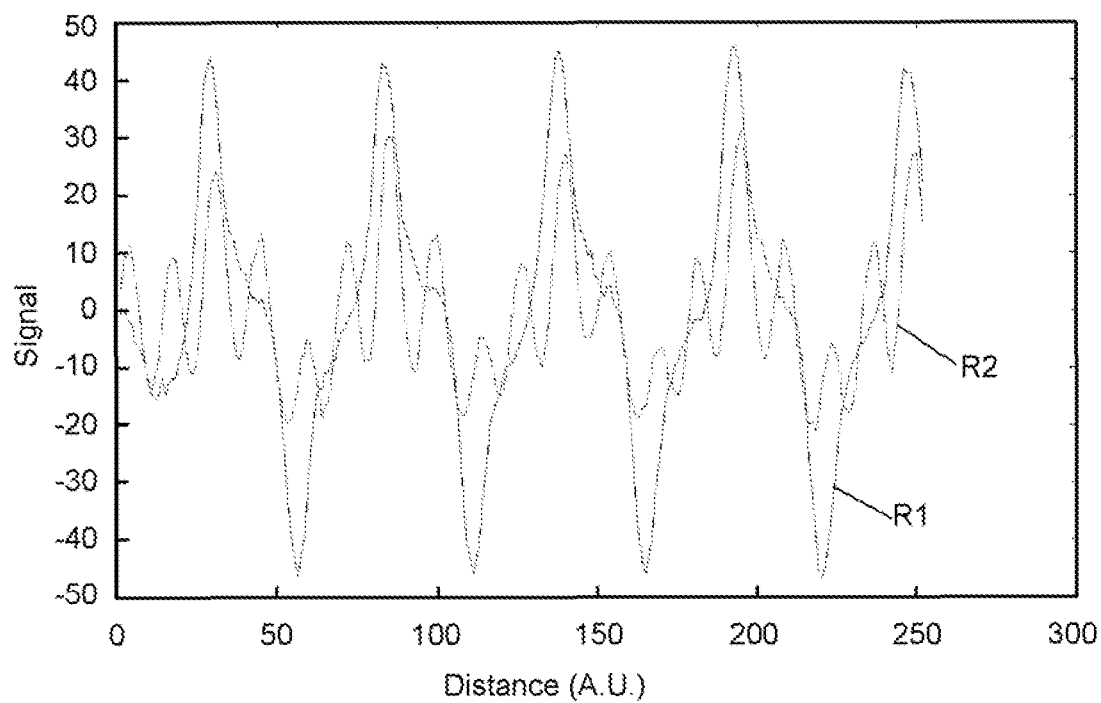
FIG. 19 is a detail of the chart of FIG. 18.

FIG. 19 is a blow up of FIG. 18 starting at channel 780 where both the R1 and R2 signals are shifted to the average of the preceding data. Particularly, the R1, 8T pattern and R2, mixed 8T and 2T patterns are shown. Only the first few 8T flux reversals are shown.

Figure 20B:
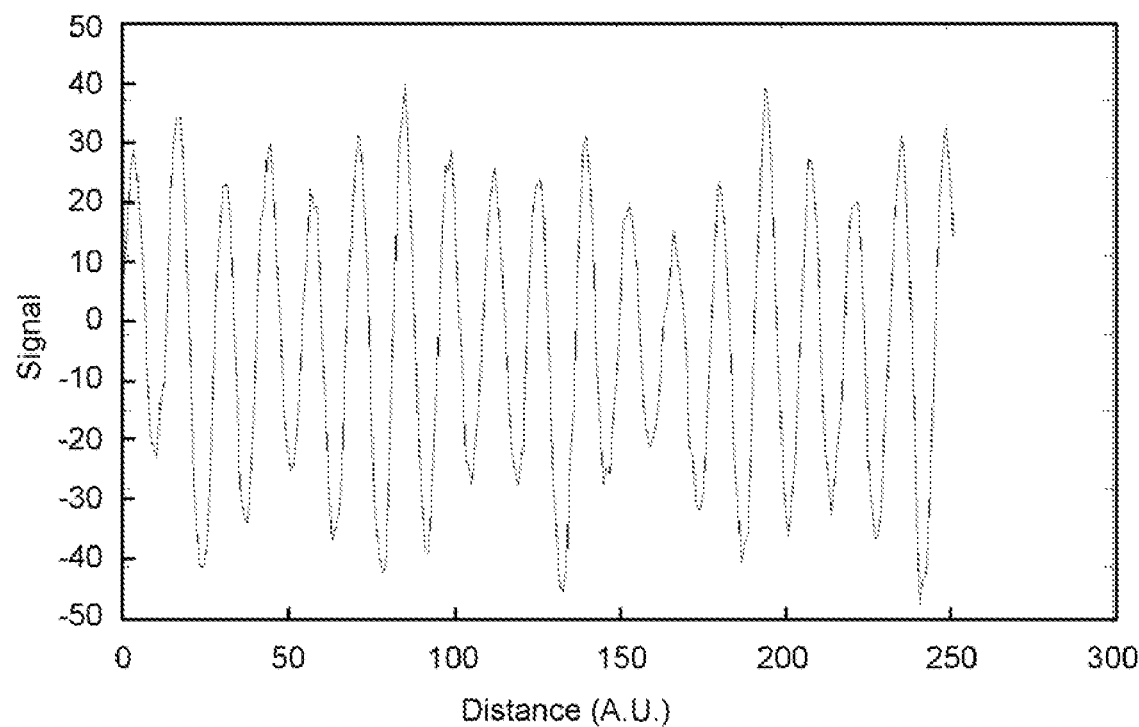
Figure 21A:
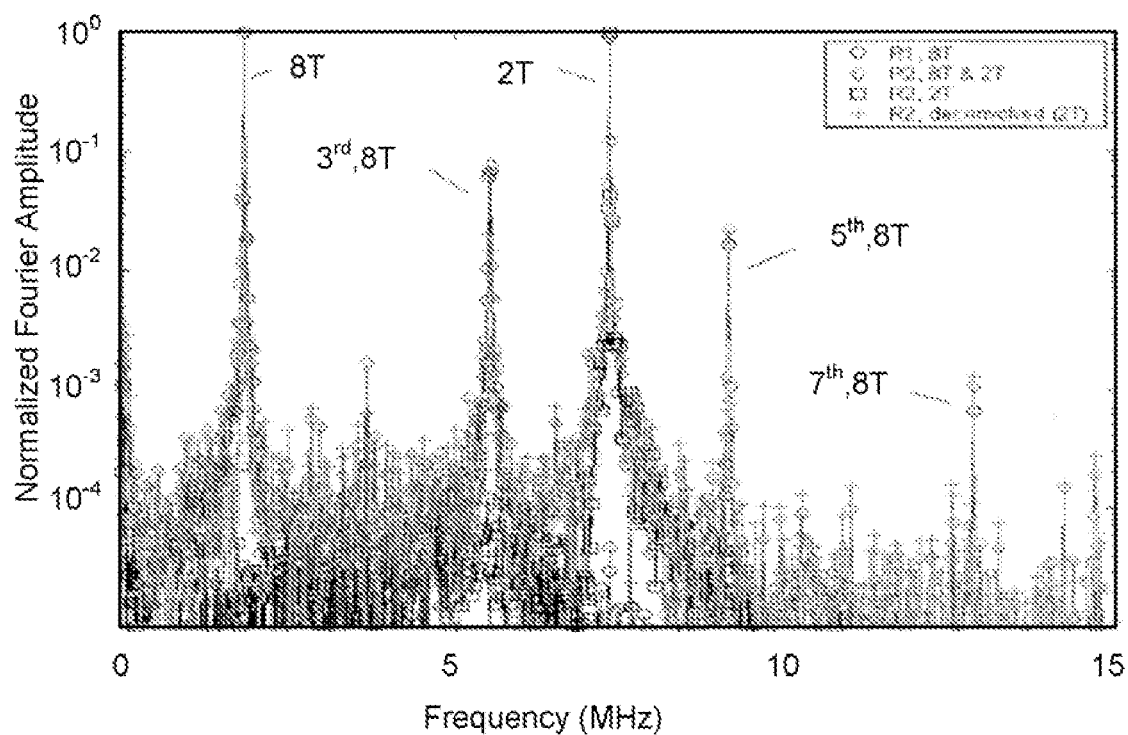
FIGS. 21A-B are charts showing a Fourier transform of signals generated by an LTO Gen 1 head.
Figure 21B:
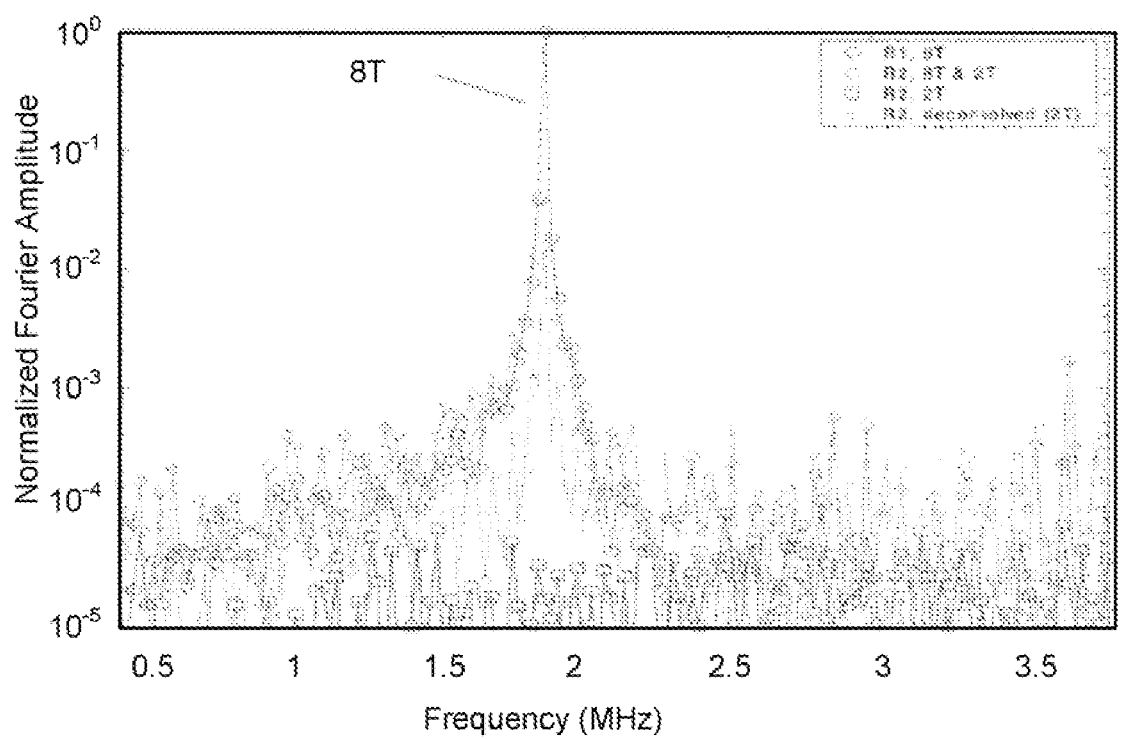

The best attempts to deconvolute the mixed signal is shown in FIG. 20B, which shows the reader R2 deconvoluted 2T pattern where the isolated 8T pattern read simultaneously with R1 on W1(8T) is subtracted from the mixed signal of R2 which was situated ~50% on written track W2(8T) and ~50% on W1(2T). FIG. 20 is equal to R2'=(2T')=R2(8T,2T)−0.43*R1(8T) or 43% of the signal from R1(8T) is subtracted from R2(2T,8T). FIG. 21A is a Fourier transform of R1(8T), R2(2T), the mixed signal R2(8T,2T) the deconvolution of the mixed signal R2, (R2, deconvoluted(2T) or R2'(2T')). The frequency content of the mixed signal R2(8T,2T) is a sum of the frequency contents of the "clean" 8T and the 2T patterns. The frequency content of the deconvoluted signal R2'(2T') is predominantly that of the 2T pattern, as seen in FIG. 21B where the fraction of the Fourier amplitude for the 8T pattern is <2% of the Fourier amplitude of the 2T pattern. Going back to time-base signals (FIGS. 20A-20B) the variation in the amplitude of R2'(2T') is larger than that of 2T pattern for R2(2T). The reason for the larger amplitude variation in R2'(2T') than R2(2T) include: (a) the 8T pattern from R1(8T) is slightly out of phase in time with R2(8T); (b) the spatial amplitude variation for R1(8T) is different from the content of the 8T pattern in R2(8T,2T); (c) the transverse motion of the tape during the measurement of R2(8T,2T) can not be compensated for with the extant LTO Gen 1 heads. Concept (c) is a major factor in the variation of the amplitudes for R2'(2T1). With a 50% overlap, nominally 6.3 µm of R2 is over W2(8T) and 6.3 µm is over W2(2T). If the tape wanders +/−0.5 µm during the span of 2.5 µs (250 channels, 10 ns/channel), then the fraction of W1(8T) will vary from 46 to 54%. With these experimental limitations, the deconvolution shown in the FIGS. yields proof of concept.

Figure 22:
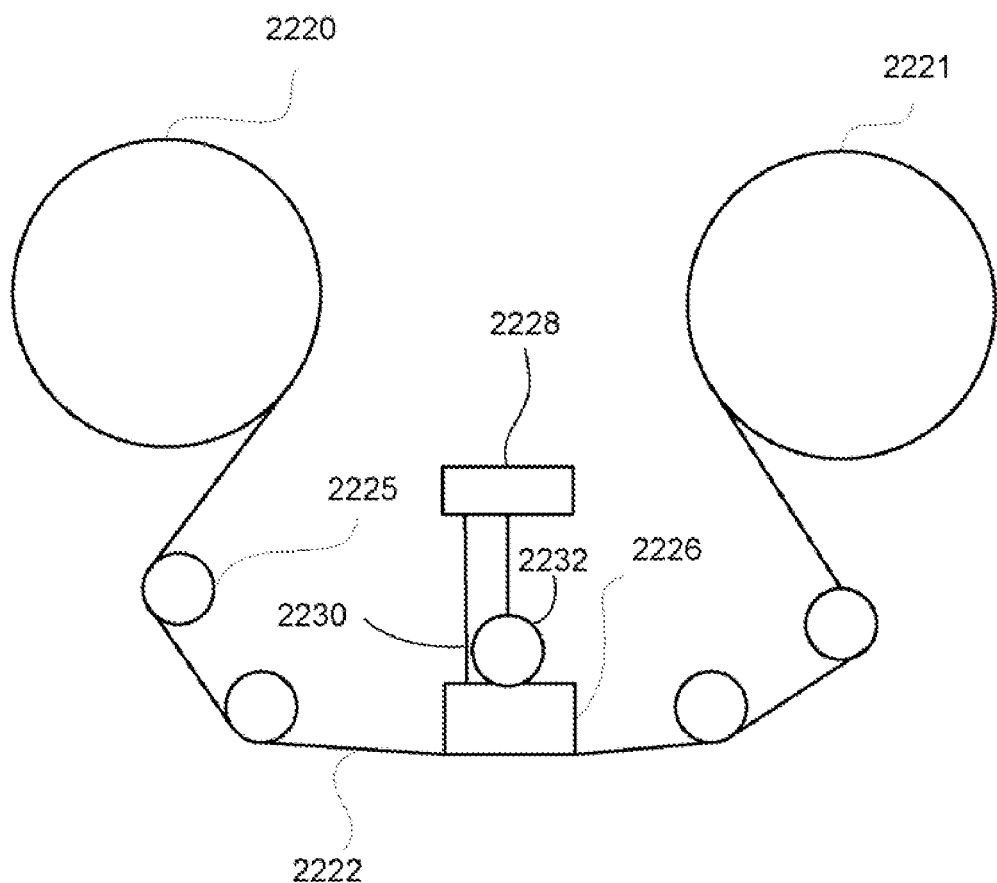
FIG. 22 illustrates a tape drive system according to one embodiment.

FIG. 22 illustrates a tape drive which may be employed in the context of the various aspects of the present invention. While one specific implementation of a tape drive is shown in FIG. 22, it should be noted that the embodiments of the previous figures may be implemented in the context of any type of drive (i.e. hard drive, tape drive, etc.)

As shown, a tape supply cartridge 2220 and a take-up reel 2221 are provided to support a tape 2222. These may form part of a removable cassette and are not necessarily part of the system. Guides 2225 guide the tape 2222 across a bidirectional tape head 2226. Such bidirectional tape head 2226 is in turn coupled to a controller assembly 2228 via a compression-type MR connector cable 2230. The actuator 2232 controls position of the head 2226 relative to the tape 2222.

A tape drive, such as that illustrated in FIG. 22, includes drive motor(s) to drive the tape supply cartridge 2220 and the take-up reel 2221 to move the tape 2222 linearly over the head 2226. The tape drive also includes a read/write channel to transmit data to the head 2226 to be recorded on the tape 2222 and to receive data read by the head 2226 from the tape 2222. An interface is also provided for communication between the tape drive and a host (integral or external) to send and receive the data and for controlling the operation of the tape drive and communicating the status of the tape drive to the host, all as understood by those of skill in the art.

The controller 2228 may perform any of the functionality described above including calculation of overlap, inverse matrix calculation, data recovery, etc. Alternatively, a host system may receive signals from the head (via any path) and perform the deconvolution. In a further alternative, the controller and host share duties. The controller and/or host may each contain mechanisms (e.g., logic, software modules, processors, etc.) to perform any function described herein.

EXAMPLE

Figure 23:
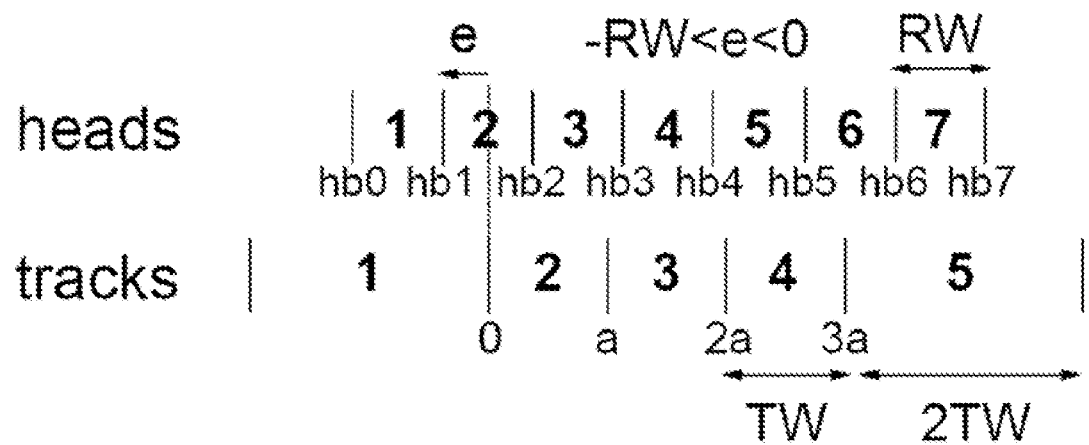
FIG. 23 is a representative diagram of readers and written tracks in accordance with an example.

FIG. 23 illustrates an example of how to calculate an overlap of readers on tracks. In the illustration seven readers 202 overlie five written tracks. Tracks 1 and 5 are alignment bands. Assume that tracks 1 and 5 have twice the track width (TW) as tracks 2-4, which allows the reader array to move within the data band. The reader width (RW) is not equal to the track width, but rather satisfies the following equation:

$$TW = aRW \quad \text{Equation 15}$$

The head boundaries are indicated on FIG. 23 as hb0-hb7. The head boundary locations are determined by the following equation:

$$hb_i = i - 1 - e/RW, \text{ for } i=0 \text{ to } 7 \quad \text{Equation 16}$$

Head equations assume linear inter-track interference. Each head signal is a linear combination of track signals:

$$h1 = t1 \quad \text{Equation 17}$$

$$h2 = \text{abs}(hb1)*t1 + hb2*t2 \quad \text{Equation 18}$$

$$h3 = (a - hb2)*t2 + (hb3 - a)*t3 \quad \text{Equation 19}$$

$$h4 = t3 \quad \text{Equation 20}$$

$$h5 = (2a - hb4)*t3 + (hb5 - 2a)*t4 \quad \text{Equation 21}$$

$$h6 = (3a - hb5)*t4 + (hb6 - 3a)*t5 \quad \text{Equation 22}$$

$$h7 = t5 \quad \text{Equation 23}$$

Here, assume a=1.3 and e/RW=0.5. The resulting head boundary positions are calculated as:

hb1=−0.5, hb2=0.5, hb3=1.5, hb4=2.5, hb5=3.5, hb6=4.5

Plugging this information into Equations 17-23:

| Head equations: | Track equations:<br>[add head equations with same track] |
|---|---|
| h1 = t1 | 1.5*t1 + 0.5*t2 = h1 + h2 |
| h2 = 0.5*t1 + 0.5*t2 | 0.5*t1 + 1.3*t2 + 0.2*t3 = h2 + h3 |
| h3 = 0.8*t2 + 0.2*t3 | 0.8*t2 + 1.3*t3 + 0.9*t4 = h3 + h4 + h5 |
| h4 = t3 | 0.1*t3 + 1.3*t4 + 0.6*t5 = h5 + h6 |
| h5 = 0.1*t3 + 0.9*t4 | 0.4*t4 + 1.6*t5 = h6 + h7 |
| h6 = 0.4*t4 + 0.6*t5 | |
| h7 = t5 | |

The matrix form of the equation is:

$$\begin{bmatrix} t1 \\ t2 \\ t3 \\ t4 \\ t5 \end{bmatrix} \begin{bmatrix} 1.5 & 0.5 & 0 & 0 & 0 \\ 0.5 & 1.3 & 0.2 & 0 & 0 \\ 0 & 0.8 & 1.3 & 0.9 & 0 \\ 0 & 0 & 0.1 & 1.3 & 0.6 \\ 0 & 0 & 0 & 0.4 & 1.6 \end{bmatrix}^{-1} \begin{bmatrix} 1100000 \\ 0110000 \\ 0011100 \\ 0000110 \\ 0000011 \end{bmatrix} \begin{bmatrix} h1 \\ h2 \\ h3 \\ h4 \\ h5 \\ h6 \\ h7 \end{bmatrix}$$

The matrix equation can be used to cancel intertrack interference. The output of the matrix equation can be input to standard 1D channels. Also note that the offtrack signal can also be derived from a servo system, and can also be updated in a detector.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disks—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

network adapters may also be coupled to the system to enable the data processing system to become coupled to other data processing systems or remote printers or storage devices through intervening private or public networks. Modems, cable modem and Ethernet cards are just a few of the currently available types of network adapters.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system for reading a magnetic medium having a data band thereon, the data band comprising a plurality of simultaneously written data tracks and at least one alignment band, the system comprising:
    a plurality of adjacent readers for simultaneously reading the data tracks and the at least one alignment band, at least some of the readers overlapping multiple data tracks;
    a mechanism for determining a fractional overlap of the readers overlapping the data tracks based on readback of the at least one alignment band; and
    a mechanism for extracting data from readback of the data tracks based at least in part on the fractional overlap.

2. A system as recited in claim 1, wherein the number of readers is at least equal to the number of written tracks in the data band.

3. A system as recited in claim 1, wherein two alignment bands sandwich the data tracks, each alignment band including a blank track.

4. A system as recited in claim 3, wherein the blank tracks are at least one of direct current (DC) erased tracks and alternating current (AC) erased tracks.

5. A system as recited in claim 3, wherein one of the alignment bands includes first and second blank tracks sandwiching a track with a predefined signal; wherein the other alignment band is a third blank track.

6. A system as recited in claim 3, wherein each alignment band includes first and second blank tracks sandwiching a track with a predefined signal.

7. A system as recited in claim 1, wherein a spacing between centerpoints of some of the readers is about equal to centerlines of the data tracks.

8. A system as recited in claim 1, wherein the data is extracted from the reader signals using an inversion matrix.

9. A system as recited in claim 8, wherein the inversion matrix is predefined except for the fractional overlap.

10. A system as recited in claim 1, wherein the fractional overlap is determined from signals of at least two readers reading the alignment band.

11. A system as recited in claim 1, wherein the track alignment signal is present in a track with a known signal, wherein the known signal is a monotone pattern.

12. A system as recited in claim 1, wherein the track alignment signal is further used to fine tune alignment of the readers with respect to the written tracks.

13. A system as recited in claim 1, wherein the at least one alignment band also provides timing information for clock recovery.

14. A system as recited in claim 1, wherein the system is calibrated by performing a microtrack profile calibration which includes shifting the readers perpendicularly with respect to the direction of media travel across the data tracks.

15. A system as recited in claim 1, further comprising a drive mechanism for passing a magnetic recording tape over the readers.

16. A method for reading a magnetic medium having a data band thereon, the data band comprising a plurality of written data tracks, the method comprising:
    receiving signals from a plurality of adjacent readers simultaneously reading data tracks, at least some of the readers overlapping multiple data tracks;
    determining a fractional overlap of each reader relative to the data tracks the reader overlaps; and extracting data from readback of the data tracks based at least in part on the fractional overlap using an inversion matrix.

17. A method as recited in claim 16, wherein the inversion matrix is predefined except for the fractional overlap.

18. A system for reading a magnetic medium having a data band thereon, the data band comprising a plurality of data tracks and at least one alignment band, the system comprising:

a plurality of adjacent readers for simultaneously reading the data tracks and at least one alignment band written simultaneously with the data tracks, at least some of the readers overlapping multiple data tracks;

a mechanism for determining a fractional overlap of the readers overlapping the data tracks based on readback of the alignment band;

a mechanism for extracting data from readback of the data tracks based at least in part on the fractional overlap.

19. A system as recited in claim 18, wherein the data is extracted from the reader signals using an inversion matrix.

20. A system as recited in claim 19, wherein the inversion matrix is predefined except for the fractional overlap.

* * * * *